United States Patent [19]

Wakabayashi et al.

[11] Patent Number: 5,142,543

[45] Date of Patent: Aug. 25, 1992

[54] METHOD AND SYSTEM FOR CONTROLLING NARROW-BAND OSCILLATION EXCIMER LASER

[75] Inventors: Osamu Wakabayashi; Masahiko Kowaka, both of Hiratsuka, Japan

[73] Assignee: Kabushiki Kaisha Komatsu Seisakusho, Tokyo, Japan

[21] Appl. No.: 439,356

[22] PCT Filed: Jan. 27, 1989

[86] PCT No.: PCT/JP89/00080

§ 371 Date: Nov. 22, 1989

§ 102(e) Date: Nov. 22, 1989

[87] PCT Pub. No.: WO89/07353

PCT Pub. Date: Aug. 10, 1989

[30] Foreign Application Priority Data

Jan. 27, 1988 [JP] Japan ............... 63-16400
Mar. 31, 1988 [JP] Japan ............... 63-79527

[51] Int. Cl.[5] .................................. H01S 3/13
[52] U.S. Cl. .......................... 372/32; 372/57; 372/28; 372/19; 372/59
[58] Field of Search .............. 372/57, 28, 87, 32, 372/19, 59

[56] References Cited

U.S. PATENT DOCUMENTS 4,823,354 4/1989 Znotins et al. ............... 372/57
4,829,536 5/1989 Kajiyama et al. ............. 372/57
4,905,243 2/1990 Lokai et al. .................. 372/28

Primary Examiner—Léon Scott, Jr.
Attorney, Agent, or Firm—Graham & James

[57] ABSTRACT

A method for controlling a narrow-band oscillation excimer laser which is suitable for control of an excimer laser used as a light source of a reduced projection exposer, and a system thereof. At least two wavelength selective element are disposed within a laser oscillator. There are provided a center wavelength control for causing an oscillation center wavelength determined by these wavelength selective elements to coincide with a desired value, an overlapping control for overlapping the transmission wavelengths of these wavelength selective elements, and a power control for controlling a voltage applied to electrodes located within a laser chamber to thereby control a laser output. Partial gas replacement is carried out when the application voltage to the electrodes within the laser chamber becomes high. After execution of the partial gas replacement, such control is carried out that the control period of the overlapping control is set to be substantially equal to that of the power control or that the overlapping control is inhibitd during the power control. At the time of activating the laser, the overlapping control is first carried out and then the center wavelength control is carried out.

17 Claims, 27 Drawing Sheets

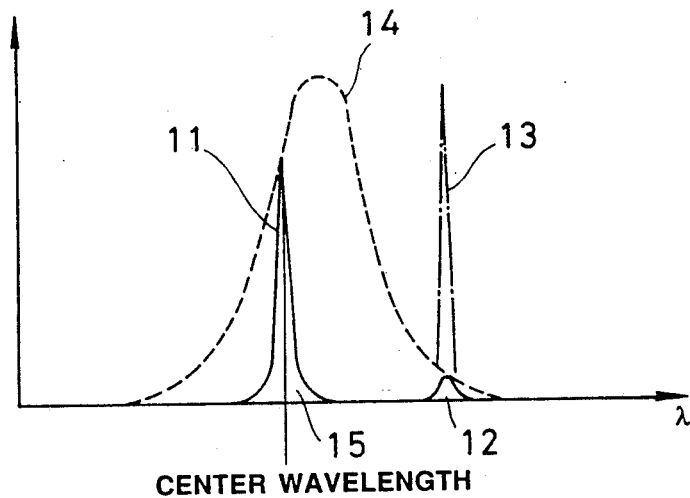
FIG. 2(a) SIDE PEAK
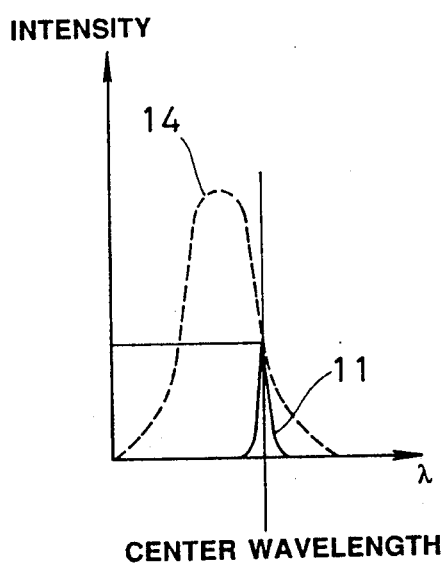 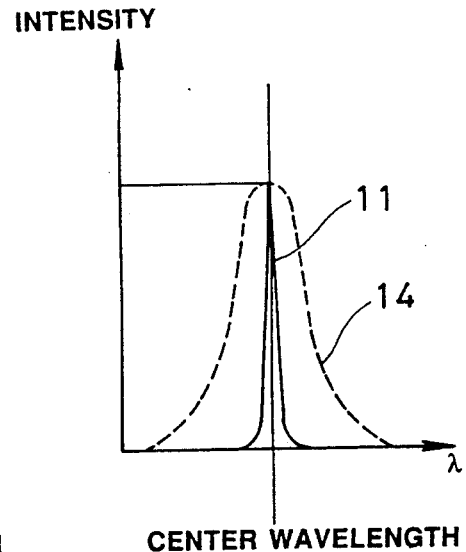
FIG. 2(b) IMPROPERLY OVERLAPPED    FIG. 2(c) PROPERLY OVERLAPPED

METHOD AND SYSTEM FOR CONTROLLING NARROW-BAND OSCILLATION EXCIMER LASER

TECHNICAL FIELD

The present invention relates to methods and systems for controlling a narrow-band oscillation excimer laser, and more particularly, to a method for controlling an excimer laser that is used as a light source of a reduced projection exposer.

BACKGROUND ART

Much attention has been focused on the utilization of an excimer laser as a light source of a reduced projection exposer for fabrication of semiconductor devices. This is because the utilization of the excimer laser as such a light source can expect many excellent advantages including the limit wavelength of exposure light reduced to below 0.5 μm because of the short wavelength of the excimer laser (the wavelength of a KrF laser being about 248.4 nm), a focus depth larger than that for the g or i rays of a prior art mercury-vapor lamp so long as a resolution power is identical, a small lens numerical) aperture (NA), an enlarged light exposure area, and a high output power.

However, the excimer laser has two big problems when used as the light source of the reduced projection exposer.

One of the problems is that, since the output light wavelength of the excimer laser is as short as 248.35 nm, this limits the materials through which this wavelength of light can pass, to only quartz, $CaF_2$, and $MgF_2$, and further among these materials, only quartz can be used as the material of the lens, when taking its homogeneity and machining accuracy into consideration. For this reason, it becomes impossible to design the reduced projection lens subjected to a chromatic aberration correction. Accordingly, this requires the band of the excimer laser to be narrowed to such an extent that the chromatic aberration is negligible.

The other problem is to suppress an undesired speckle pattern developed by narrowing the band of the excimer laser and also to avoid reduction in the laser power caused by the narrowed band.

One of techniques for narrowing the band of an excimer laser is known as the injection lock system. In the injection lock system, wavelength selective elements (such as etalons, diffraction gratings or prisms) are disposed with a cavity at an oscillator stage so that pin holes limits its spatial modes, the laser oscillates in a single mode, and the oscillated laser beam is synchronously injected into its amplification state. For this reason, the output laser beam is highly coherent and thus when such output beam is used as the light source of the reduced projection exposer, an undesired speckle pattern takes place. Generally speaking, the generation of a speckle pattern is considered to depend on the number of spatial transversal modes contained in the laser beam. More specifically, it is known that a smaller number of spatical transversal modes included in the laser beam tends to more develop a speckle pattern, whereas a larger number of spatial transversal modes tends to less develope a speckle pattern. The aforementioned injection lock system, which is a technique for achieving a narrow band essentially by remarkably decreasing the number of spatial transversal modes, cannot be employed in the reduced projection exposer, since it involves the development of a speckle pattern as a big problem.

There is another promising technique for narrowing the band of an excimer laser which uses etalons. As a prior art of such etalon-based techniques, there has been proposed such a technique from the AT & T Bell Laboratory that etalons are disposed between a front mirror and a laser chamber in an excimer laser to realize the narrowed band of the excimer laser. This system, however, has had problems and defects that a spectrum line width cannot be narrowed satisfactorily, a power loss due to the etalon insertion is large, and the number of spatial transversal mode cannot be made considerably large.

To solve the above problems, the inventors of the present application provide such an arrangement that wavelength selective elements having a large effective diameter (about several ten mm) such as etalons are interposed between a rear mirror and a laser chamber in an excimer laser so that the uniform narrow band of the laser is about below 0.003 nm in full width at half maximum in output beam of about 50 mJ per pulse. That is, when there is employed such an arrangement of the etalons disposed between the rear mirror and laser chamber of the excimer laser, the essential conditions of the laser required to be used as the light source of a reduced projection exposer, that is, the problems or requirements of narrowing the band of the laser, positively acquiring the necessary number of spatial transversal modes and minimizing the power loss caused by the etalon insertion can be solved.

The arrangement of the wavelength selective elements disposed between the rear mirror and laser chamber of the excimer laser is advantageous in that the band of the laser can be narrowed, the necessary number of spatial transversal modes can be positively acquired and the power loss caused by the etalon insertion can be reduced, but defective in that the above solving means cause variations in the center wavelength of an oscillated output beam of the laser, the oscillation of the laser at multiple wavelengths or the remarkable reduction of laser power. This tendency becomes remarkable, in particular, when two or more wavelength selective elements having different free spectral ranges are employed for the purpose of narrowing the laser band.

For eliminating the above disadvantages, the inventors of the present application suggest a laser control method in which the center wavelength and output power of a laser is stabilized by executing the following three controls at the same time or alternately.

(1) Center wavelength control

Shifts the transmission wavelength of one of the wavelength selective elements at least having a minimum free spectral range to thereby make the center wavelength of the laser output coincide with a desired value.

(2) Overlapping control

Shifts respectively the transmission center wavelengths of ones of the wavelength selective elements other than the element having the minimum free spectral range to overlap the transmission center wavelengths of all the wavelength selective elements and thereby obtain a maximum laser output.

(3) Power control

Controls a voltage applied to electrodes provided within the laser chamber in such a manner that the laser output power has a desired level.

Meanwhile, the properties of a laser medium gas used in an excimer laser gradually deteriorate with time, for which reason it becomes difficult to obtain a desired output power by means of only the power control based on the control of the electrode application voltage. To remove such difficulty, in the present invention, when the electrode application voltage exceeds the desired level, the components of the laser gas are controlled, that is, partial laser gas replacement is carried out. However, the execution of the partial laser gas replacement causes the gradual increase of the laser output power. For the purpose of suppressing such increase in the laser output power, the above power control is executed. In this connection, since an increase in the laser output power caused by the partial laser gas replacement is a different sort of phenomenon from stationary-mode output variations, the stationary-mode power control cannot cope properly with the output power increase.

In addition, when the partial laser gas replacement is carried out, the laser is subjected to the influence of the partial gas replacement for a considerably long period of time, during which the laser cannot produce a stable output power by means of the stationary-mode control.

It is therefore a first object of the present invention to provide a method of controlling a narrow-band oscillation excimer laser which can reliably follow a power variation caused by the above partial laser gas replacement and can produce a stable laser output power.

With such a narrow-band excimer laser, the overlapped condition of the etalons is improper, in general, at the time of initiating the laser and thus the laser output is very low, which may sometimes result in that the laser oscillation cannot be achieved or such oscillation can be attained only with a power level lower than the laser power and wavelength detection limit of a power monitor, thus disabling the detection of the laser power and wavelength.

For this reason, it is impossible to accurately detect the center wavelength of an output beam of the laser at the time of activating or initiating the laser, and therefore it is difficult to first perform the center wavelength control of causing the center wavelength of the laser output beam to coincide with a desired value.

Accordingly, a second object of the present invention is to provide a system of controlling a narrow-band excimer laser which can quickly control the laser at the time of initiating the laser.

DISCLOSURE OF INVENTION

In accordance with an aspect of the present invention, there is provided a method for controlling a narrow-band oscillation excimer laser wherein an output of the laser is controlled by controlling a voltage applied to electrodes provided within a laser chamber so that partial gas replacement is carried out when the application voltage becomes high; characterized in that a stationary control mode suitable for stationary control and a partial gas replacement control mode suitable for partial gas replacement control are separately set and when the partial gas replacement is carried out, the partial gas replacement control mode is executed at least until a predetermined time elapses or until the application voltage is reduced to a predetermined level or until the predetermined time elapses and the application voltage is reduced to the predetermined level.

In accordance with another aspect of the present invention, there is provided a method for controlling a narrow-band oscillation excimer laser wherein at least two wavelength selective elements are disposed within a laser oscillator, a center wavelength control is provided for causing an oscillation center wavelength determined by the wavelength selective elements to coincide with a desired value, an overlapping control is provided for overlapping transmission wavelengths of the wavelength selective elements, a power control is provided for controlling the application voltage to the electrodes within the laser chamber to thereby control the laser output, the partial gas replacement control is executed for partial gas replacement when the application voltage becomes high, and characterized in that a first control mode is provided in which a control period of the power control is set to be longer than a control period of the overlapping control, and a second control mode is provided in which the control period of the power control is set to be substantially equal to the control period of the overlapping control or the overlapping control is inhibited during execution of the power control, and after the partial gas replacement is executed, at least the second control mode is carried out.

In this invention, for the purpose of obtaining a power level sufficient for the wavelength control, the overlapping control of overlapping the transmission wavelengths of the wavelength selective elements is first carried out at the time of initiating the laser. Thereafter, when the power level sufficient for the wavelength control is obtained through the above overlapping control, the center wavelength control is carried out to cause the center wavelength of the laser output beam to coincide with a desired value.

The overlapping control enables the acquisition of the output power sufficient for the center wavelength control, thereby ensuring the execution of the center wavelength control in a short time.

BRIEF DESCRIPTION OF DRAWINGS

FIGS. 2(a)-2(c) show waveforms for explaining an overlapping control;

BEST MODE FOR CARRYING OUT THE INVENTION

Figure 1:
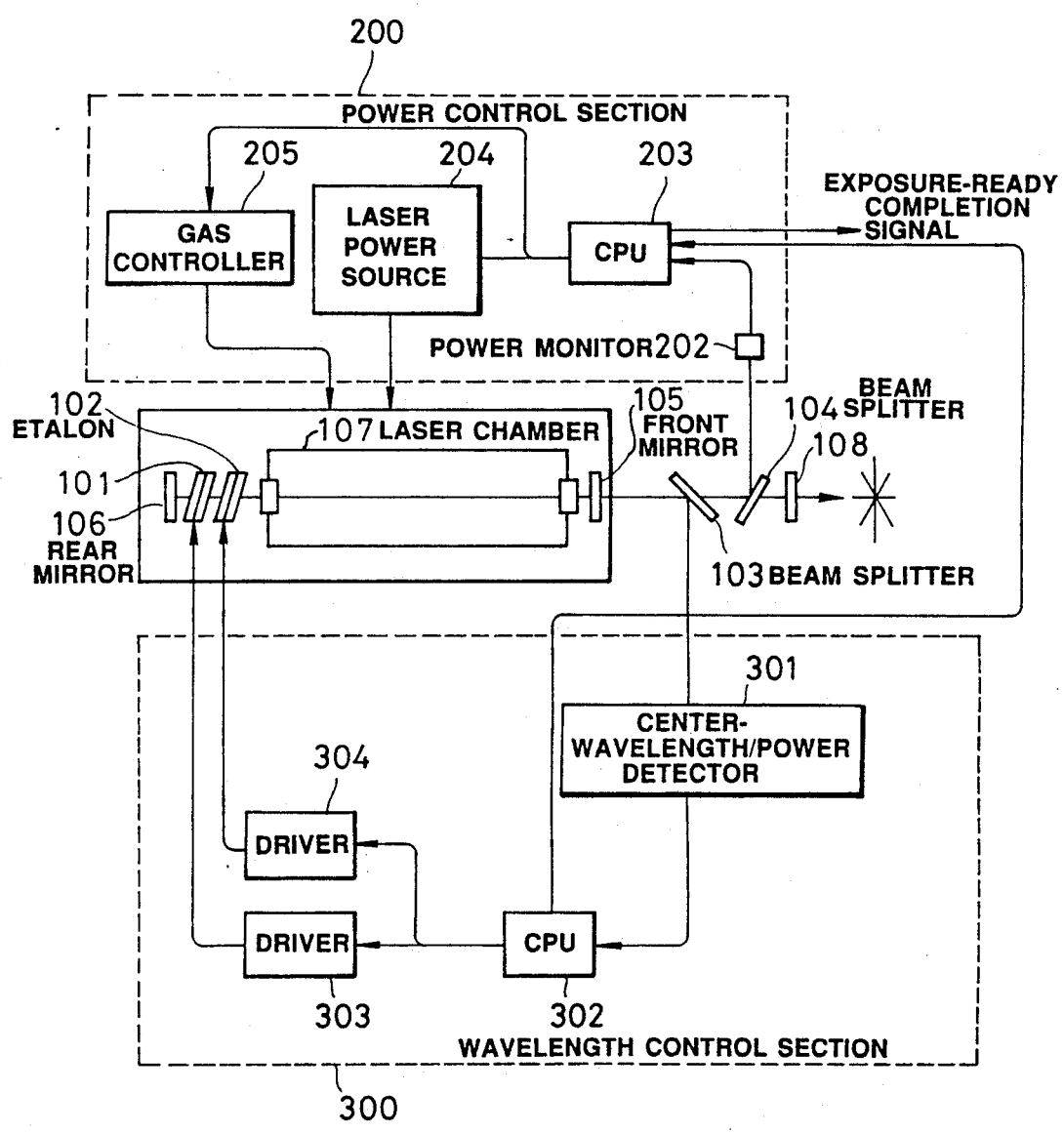
FIG. 1 is a block diagram showing an embodiment of the present invention.

Referring to FIG. 1, there is shown a block diagram of an excimer-laser control system in accordance with an embodiment of the present invention, in which two etalons 101 and 102 are interposed between a laser chamber 107 and a rear mirror 106.

The excimer-laser control system in accordance with the present embodiment includes a power control section 200 for controlling output power of a laser through the control of components of a laser medium gas trapped within the laser chamber 107 and through the control of exciting intensity of the laser medium (through the control of a voltage applied to not shown electrodes), and also includes a wavelength control section 300 for carrying out center wavelength control to control the center wavelength of an output of the laser and overlapping control to overlap the center wavelengths of frequencies of light passed through the etalons 101 and 102 at the same time or alternately.

Explanation will first be made as to the operation of the power control and wavelength control sections 200 and 300 when they are in their stationary state. In general, a laser medium gas used in an excimer laser deteriorates with time passage in its laser medium property, which results in that the power of the laser drops with time. In order to keep the output of the laser constant, the aforementioned exciting-intensity control section 200 is provided to control over the output of the laser. That is, the laser output control is carried out by controlling the components of the laser medium, i.e., performing partial replacement over the gas and also by controlling the exciting intensity of the laser medium, i.e., a voltage applied to electrodes. More specifically, as shown in FIG. 1, an oscillated laser beam is partially branched by a beam splitter 104 and directed toward a power monitor 202 so that the monitor monitors a change in the laser power, whereby a CPU 203 changes the exciting intensity of the laser medium through a laser power supply 204 or performs the partial replacement of the laser medium gas under a gas controller 205, thereby realizing the output control to keep the laser output constant.

The CPU 203 measures a time elapsed from the moment when the laser medium gas has been fully replaced and counts the total number of laser oscillation pulses, judges, on the basis of the elapsed time and the total pulse number as its data, the deterioration degree of the laser medium gas, computes the exciting intensity of the laser medium gas necessary to obtain a desired laser power Pa, i.e., computes a discharging voltage Va, and controls the laser power supply 204 on the basis of a computed value of the discharging voltage.

The oscillated laser beam, on the other hand, is also partially branched by another beam splitter 103 as a sampling beam and directed toward a detector 301 which detects an oscillation center wavelength and the power of the center wavelength. That is, the center wavelength/center wavelength power detector 301 detects an oscillation center wavelength $\lambda$ of an excimer laser 10 contained in the sampling beam and a power $P_\lambda$ of the center wavelength. In this embodiment, detection of the center-wavelength power $P_\lambda$, is carried out by sampling and averaging a predetermined number of laser output pulses.

The center wavelength $\lambda$ and its power $P_\lambda$ detected by the detector 301 is applied to another central processing unit (CPU) 302 comprising a wavelength controller.

The CPU 302 controls the wavelength selection characteristics (transmission center wavelength and selection center wavelength) of the etalons 101 and 102 through drivers 303 and 304 in such a manner that the center wavelength of the sampling beam, i.e., the output beam of the excimer laser coincides with a predetermined desired wavelength (center wavelength control and the center wavelength power becomes a maximum (overlapping control). In the illustrated embodiment, the control of the wavelength selection characteristics of the etalons 101 and 102 through the drivers 303 and 304 is carried out by adjusting the temperature and angle of the etalons, the pressure of an air gap and the gap spacing thereof.

More in detail, the center wavelength control is realized by controlling the angle or the like of one of the etalons 101 and 102 at least having a smaller free spectral range to shift the transmission wavelength of the etalon in question, thereby controlling the output center wavelength to have a desired value, i.e., the oscillation center wavelength detected at the detector 301 to have the desired value. On the other hand, the overlapping control is carried out by shifting, in increments of a predetermined unit wavelength, the transmission center wavelength of one of the etalons other than the aforementioned etalon having the smaller free spectral range, that is, having a larger free spectral range, thereby overlapping the transmission center wavelengths of the etalons 101 and 102 and maximizing the center wavelength power detected at the detector 301.

The operation of this overlapping control will be further explained by referring to FIG. 2 (a), (b) and (c). As shown in FIG. 2(a), when a mismatching takes place in the overlapping, a center transmission band 11 of one of the two etalons having the smaller free spectra range (hereinafter, which will be referred to merely as the FSR) as well as an adjacent transmission band 13 thereof are overlapped with a center transmission band 14 of the other etalon having the larger FSR, which results in that an adjacent oscillation line 12 called a side peak appears in addition to a center wavelength component 15. This mismatched overlapping also may sometimes cause the reduction of the intensity of the center wavelength component, or in other words, the reduction of power of the narrowed laser beam, as shown in FIG. 2(b).

The overlapping control is carried out by adjusting the angle or the like of the etalons 101 and 102 so as to maximum the intensity of the center wavelength component as shown in FIG. 2(c).

Explanation will next be made as to how to control the excimer-laser control system at the time of activating the excimer laser.

Figure 3:
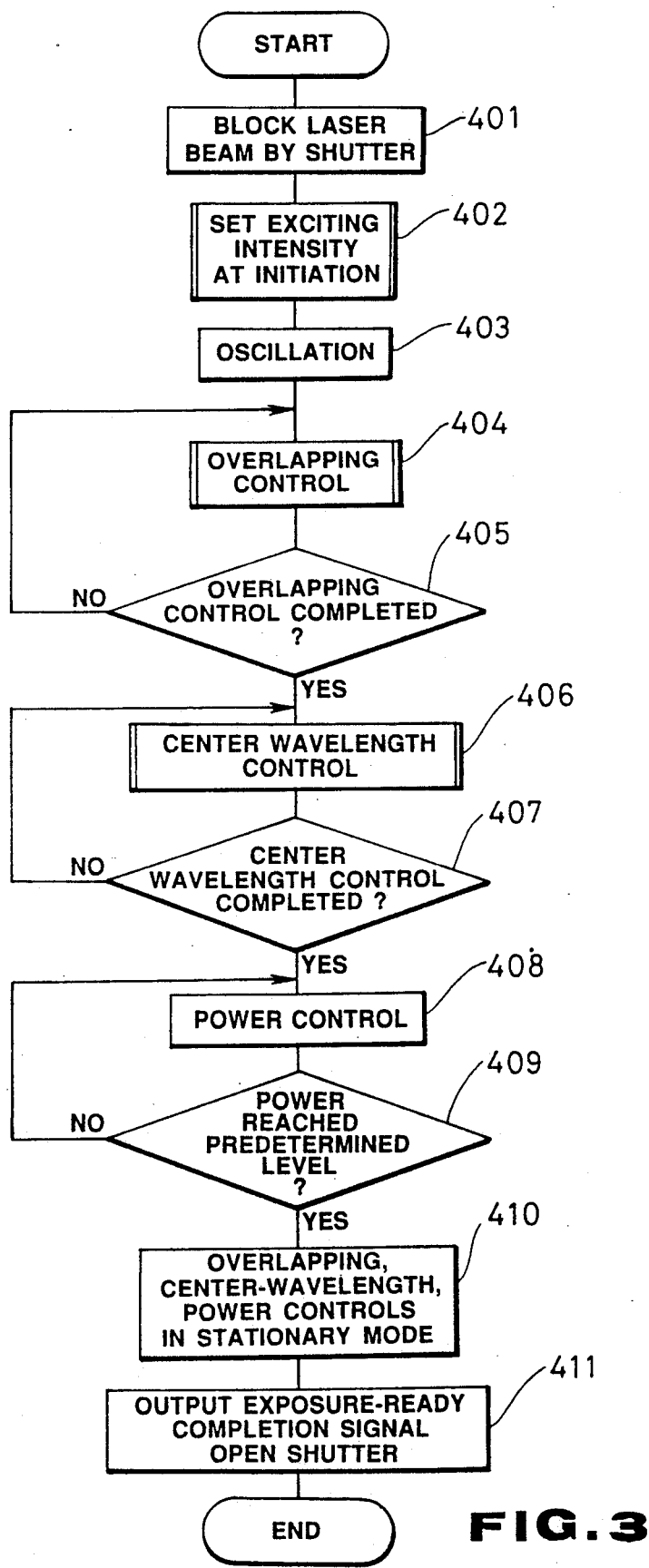
FIG. 3 is a flowchart for explaining the operation of the embodiment in its initiation mode.

FIG. 3 shows an embodiment of the control of the laser control system at the time of initiating or activating the narrow-band excimer laser having such an arrangement as shown in FIG. 1. In the laser activating mode, the overlapping condition of the etalons 101 and 102 is not good, under which condition it is impossible to use the output beam of the laser as it is, as the light source of a light exposer not shown. In the laser activating mode, therefore, such a shutter 108 as shown in FIG. 1 is kept to be closed until the laser power becomes stable, to thereby block a laser beam to be directed toward the light exposer (step 401).

Figure 4:
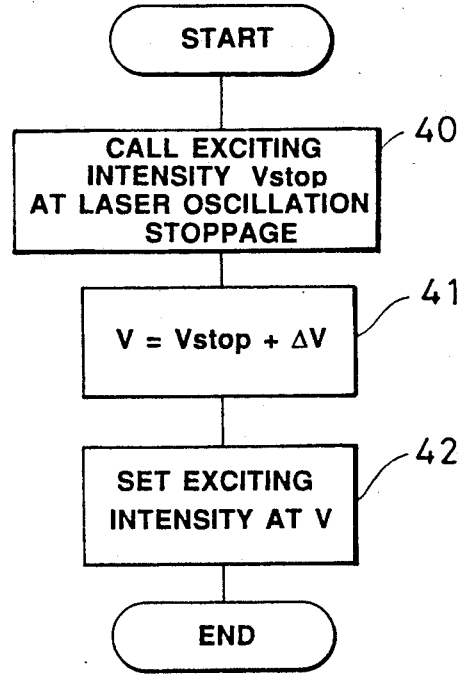
FIGS. 4, 5, 6, 7 and 8 are flowcharts showing different configuration examples of an exciting-intensity setting subroutine, in the initiation mode, respectively.

Then, an exciting intensity or a discharging voltage in the laser activating mode is set (subroutine 402). In this subroutine, the exciting intensity of the laser activating mode is set to be higher than a stationary exciting intensity for the purpose of obtaining the quick realization of the overlapping control in the laser activating mode. Shown in FIG. 4 are details of the subroutine 402. In FIG. 4, an exciting intensity Vstop at the time of the previous laser stoppage is first called from a not shown memory (in which the then exciting intensity Vstop at the time of the previous laser stoppage is already stored)(step 40). Subsequently, a predetermined value $\Delta V$ (which is a constant higher than zero) is added to the exciting intensity Vstop to obtain an exciting intensity V in the laser activating mode (step 41). The computed exciting intensity V is set as an exciting intensity in the laser activating mode (step 42).

Figure 5:
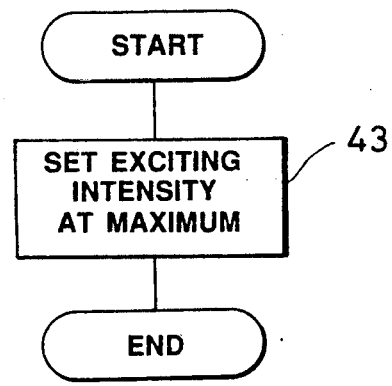
Figure 6:
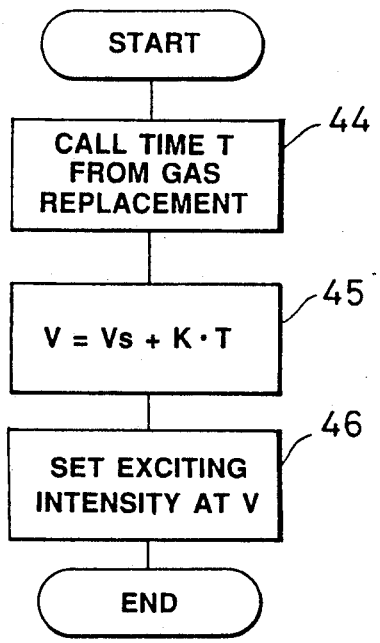
Figure 7:
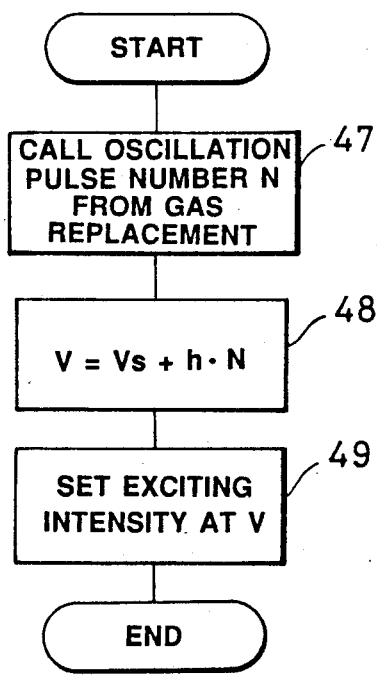
Figure 8:
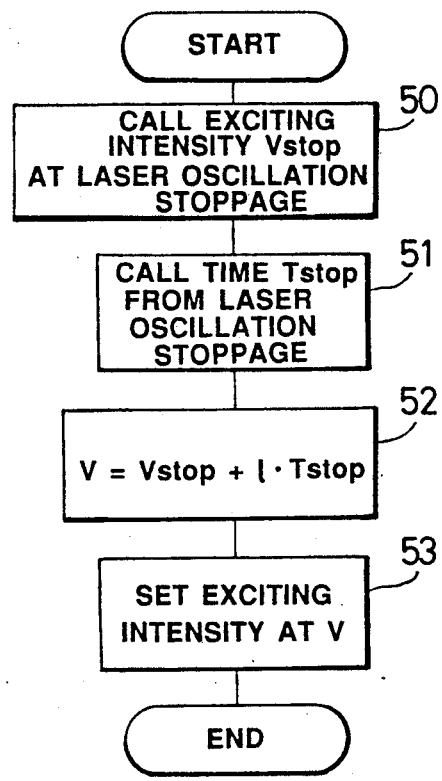

In this connection, although the predetermined value $\Delta V$ has been added to the exciting intensity Vstop at the time of the previous laser stoppage to set the exciting intensity V in the laser activating mode in the above subroutine shown in FIG. 4, the exciting intensity V in the laser activating mode may be set to be an allowable maximum exciting intensity Vmax as in such a subroutine as shown in FIG. 5. Also as shown in FIG. 6, a previously stored time T elapsed from gas replacement may be called (step 44), a calculation $V=Vs+k \cdot T$ (k being a positive constant, Vs being a predetermined exciting intensity) may be carried out (step 45), and a value V obtained through this calculation may be set as an exciting intensity in the laser activating mode (step 46). Further, as shown in FIG. 7, a previously-stored accumulated oscillation pulse number N counted from the moment of the gas replacement may be called (step 47), a calculation $V=Vs+h \cdot N$ (h being a positive constant, Vs being a predetermined exciting intensity) may be carried out (step 48), and a value V obtained through this calculation may be set as an exciting intensity in the laser activating mode (step 49). Furthermore, as shown in FIG. 8, the exciting intensity Vstop at the time of the previous stoppage of laser oscillation may be called (step 50) and a time Tstop at the time of the previous stoppage of laser oscillation may be called (step 51), after which a calculation $V=Vstop+l \cdot Tstop$ being a positive constant) may be carried out (step 52) and then a value V obtained through this calculation may be set as an exciting intensity in the laser activating mode.

In this connection, for the purpose of achieving the quicker realization of the overlapping control in the laser activating mode, an oscillation repetition frequency in the laser activating mode may be set to be higher than that in the laser stationary mode. Assuming, for example, that Fa denotes a desired repetition frequency in the stationary mode, then the repetition frequency in the laser activating mode is set at Fs that is larger than the value Fa. The value Fs, which can take any value between the value Fa and an allowable maximum repetition frequency Fmax (which is a maximum frequency up to which a rated output can be maintained), may be set at the allowable maximum repetition frequency Fmax.

Subsequent to the subroutine 402, the laser control system starts its oscillation as shown in FIG. 3 (step 403). After starting the oscillation of the laser control system, the overlapping control is first executed (subroutine 404). In this overlapping control, the transmission center wavelength of one of the etalons 101 and 102 having the larger spectral range is sequentially shifted in increments or decrements of a predetermined unit wavelength so that the laser output power, that is, the power detected by the detector 301 for detection of oscillation center wavelength and center wavelength power becomes maximum.

Figure 9:
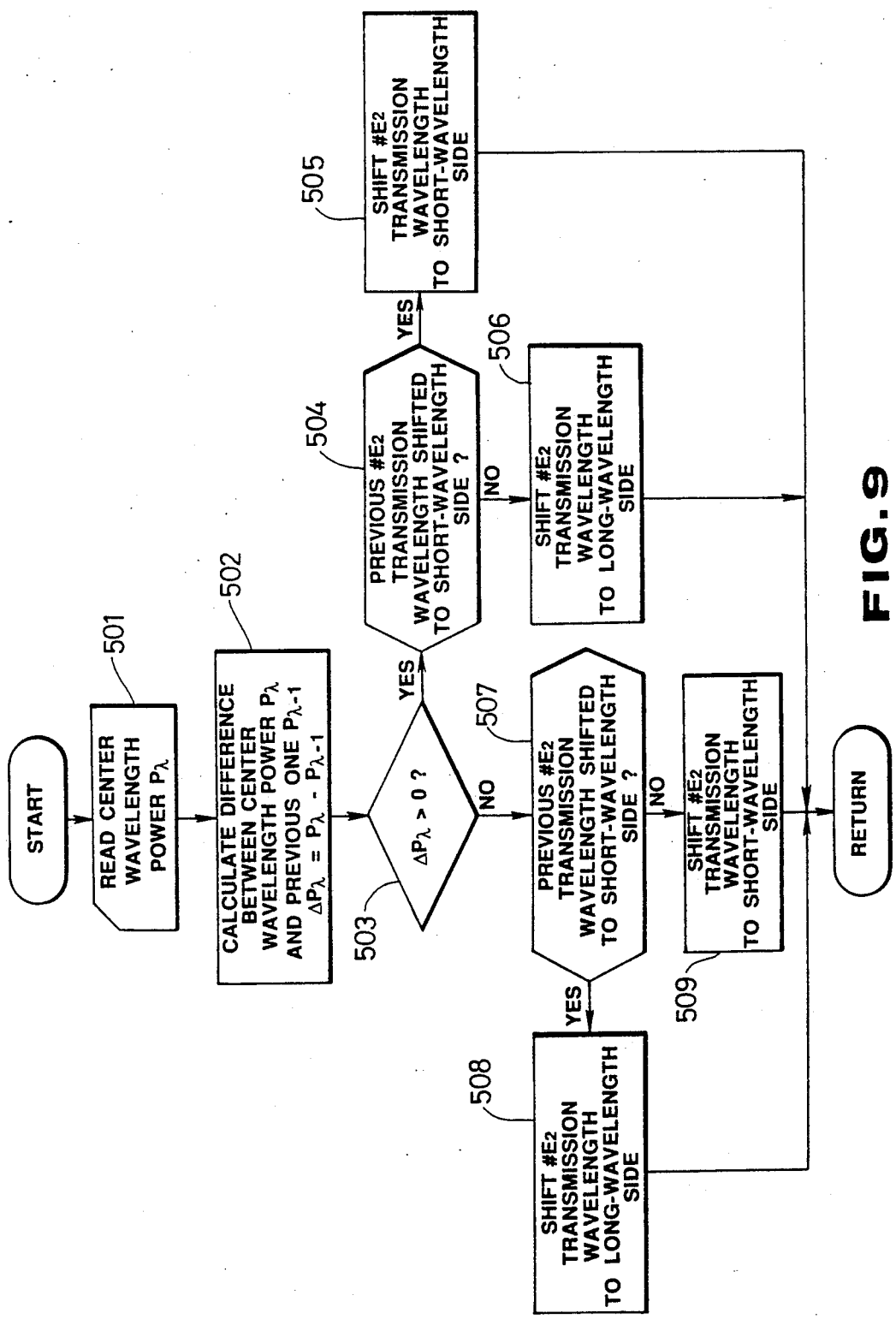
FIG. 9 is a flowchart showing a configuration example of an overlapping control subroutine.

Details of the subroutine 404 are shown in FIG. 9, in which a center wavelength power is first read in a step 501. More specifically, in the step 501, a predetermined number of oscillated laser pulses are sampled and averaged to calculate a center wavelength power $P_1$. Such processing is executed because the laser beam output power varies from pulse to pulse.

Next, in a step 502, a difference $\Delta P_\lambda$ between the previous sampled center wavelength power $P_\lambda$ is calculated ($\Delta P_\lambda = P_\lambda - P_{\lambda-1}$).

Then, judgement is made in a step 503 as to whether or not the value $\Delta P_\lambda$ calculated in the step 502 is positive ($\Delta P_\lambda > 0$). If $\Delta P_\lambda > 0$, then the program proceeds to a step 504 where judgement is made as to whether or not the transmission wavelength of one of the etalons 101 and 102 having the larger free spectral range (which etalon will be sometimes referred to as the etalon #$E_2$, hereinafter) has been shifted to its short-wavelength side. When judgement is made in the step 504 to have been shifted to the short-wavelength side, the program goes to a step 505 where the transmission wavelength of the etalon #$E_2$ is shifted further by a predetermined amount (unit shift amount) to the short-wavelength side. When judgement is made in the step 504 that the transmission of the etalon #E$_2$ has been shifted to the long-wavelength side, on the other hand, the program goes to a step 506 where the transmission wavelength of the etalon #E$_2$ is shifted by a predetermined amount (unit shift amount) to the long-wavelength side.

If judgement is made in the step 503 that $\Delta P_\lambda \leq 0$, then the program proceeds to a step 507 to determine whether or not the transmission wavelength of the etalon #E$_2$ has been shifted to the short-wavelength side. When a shift to the short-wavelength side is determined, the program branches to a step 508 to shift by a predetermined amount (unit shift amount) the transmission wavelength of the etalon #E$_2$ to the long-wavelength side. If judgement in the step 507 is that the transmission wavelength of the etalon #E$_2$ has been shifted to the long-wavelength side, this causes the program to go to a step 509 where the transmission wavelength of the etalon #E$_2$ is shifted to the short-wavelength side by a predetermined amount (unit shift amount).

In this way, in the overlapping control subroutine 404, the transmission wavelength shift direction of the etalon #E$_2$ to increase the laser beam output power is judged on the basis of the sign of the value $\Delta P_\lambda$ and the previous transmission wavelength shift direction, and the transmission wavelength of the etalon #E$_2$ is shifted by a unit shift amount in the judged direction.

In the embodiment, for the purpose of achieving the quicker realization of the overlapping control, the aforementioned unit shift amount is set to be larger than the unit shift amount in the overlapping control in the stationary mode.

Figure 10:
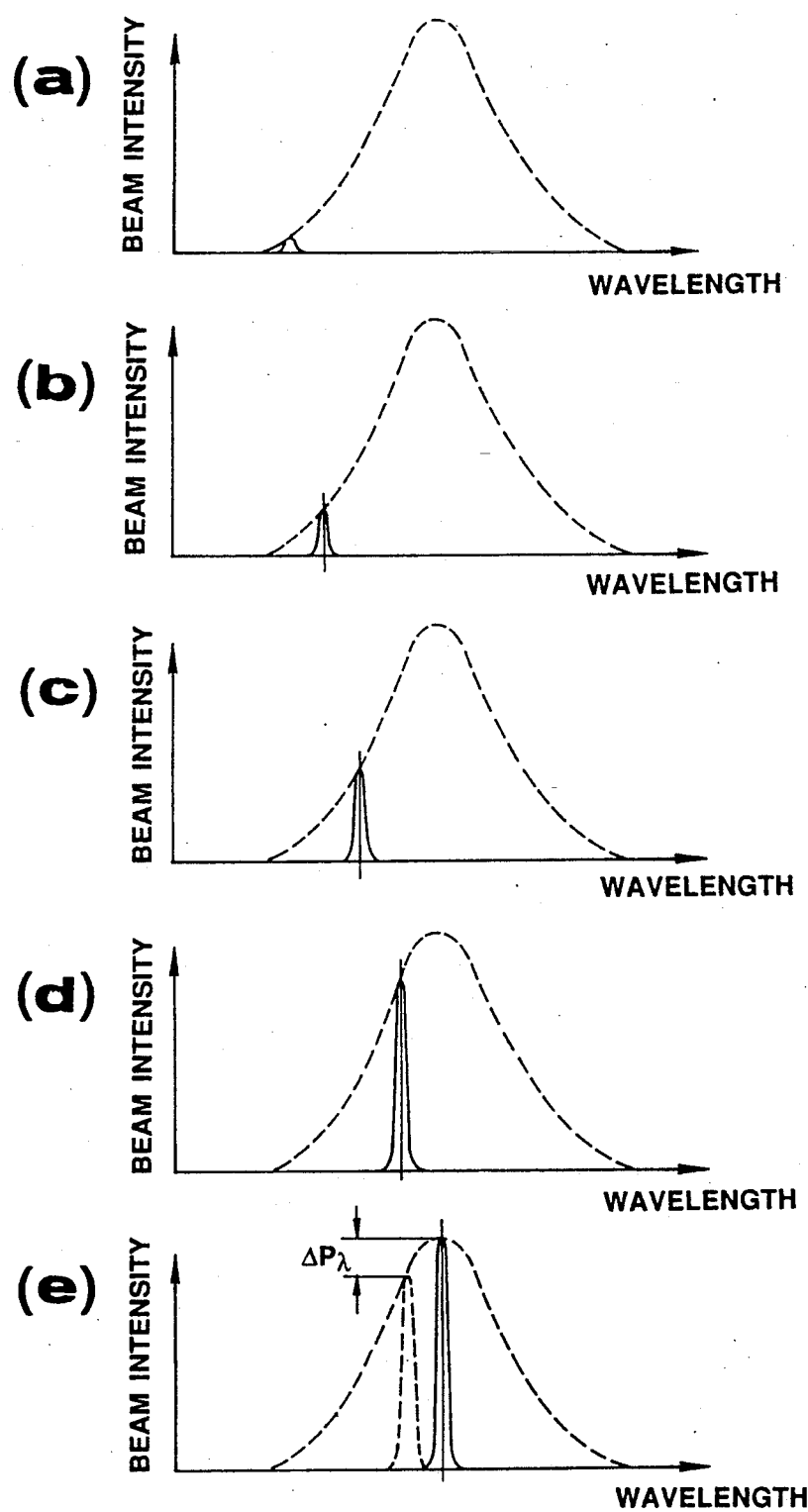
FIGS. 10(a)-10(e) show graphs for explaining the overlapping control in a laser stationary mode.
Figure 11:
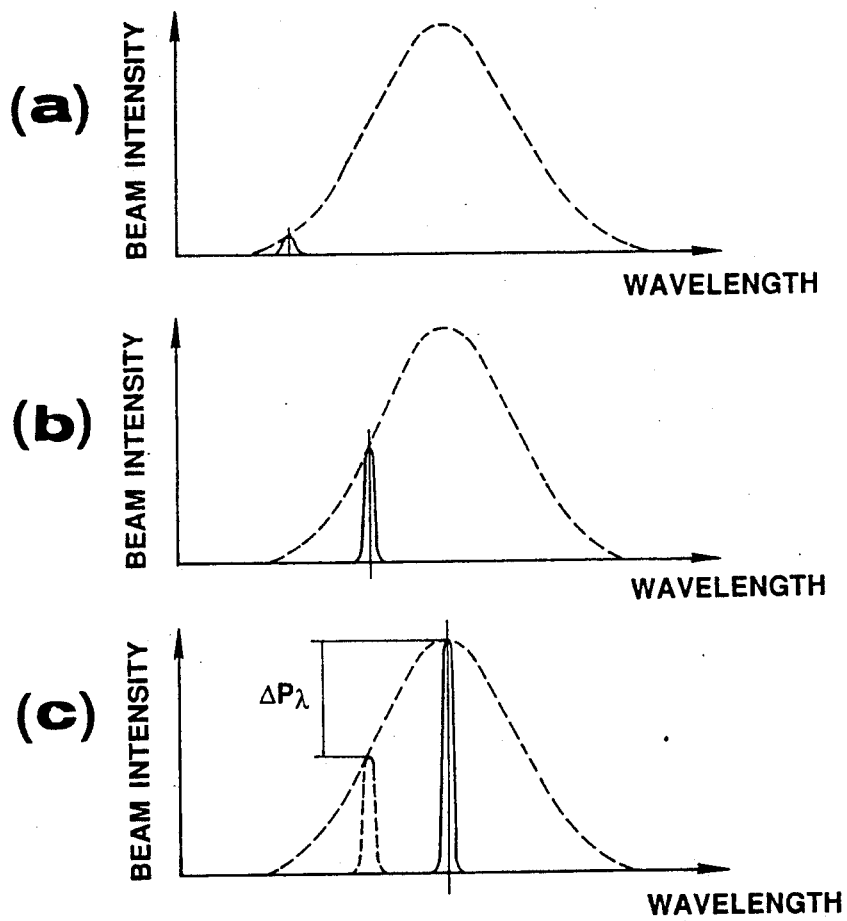
FIGS. 11(a)-11(c) show graphs for explaining the overlapping control in the laser initiation mode.

FIGS. 10 and 11 show the overlapping control in the stationary mode and the overlapping control in the laser activating mode where the unit shift amount is set to be large, for comparison. More specifically, four shift operations are required to shift the laser from its state (a) to a completed overlapping-control state (e) in the stationary mode shown in FIG. 10, whereas only two shift operation are required to shift the laser from its state (a) to a completed overlapping-control state (c) in FIG. 11, thus remarkably reducing the time necessary for the overlapping control.

Detection of the center wavelength power in the overlapping control is realized, as has already been explained, by sampling and averaging the predetermined number of laser output pulses. In the laser activating mode, the aforementioned pulse sampling number is set to be smaller than that in the stationary mode for the purpose of achieving the quicker realization of the overlapping control. The less number of sampling pulses enables the reduction of the time necessary for the sampling, whereby the time necessary for the overlapping control can be also shortened to a large extent.

In the case where the unit shift amount is set to be large as has been explained above, even if the pulse sampling number is set to be small, it is possible to sufficiently detect a change in the $\Delta P_\lambda$ because of the increased $\Delta P_\lambda$.

The overlapping control subroutine 404 has been arranged so that, in the aforementioned explanation, the transmission wavelength of the etalon #E$_2$ of the etalon 101 and 102 having the larger free spectral range is shifted in increments of a unit shift amount, but it may be arranged so that the transmission wavelength of one of the etalon 101 and 102 having the smaller free spectra range (which etalon is sometimes referred to as the etalon #E$_2$, hereinafter) is shifted in increments or decrements of a unit shift amount.

Figure 12:
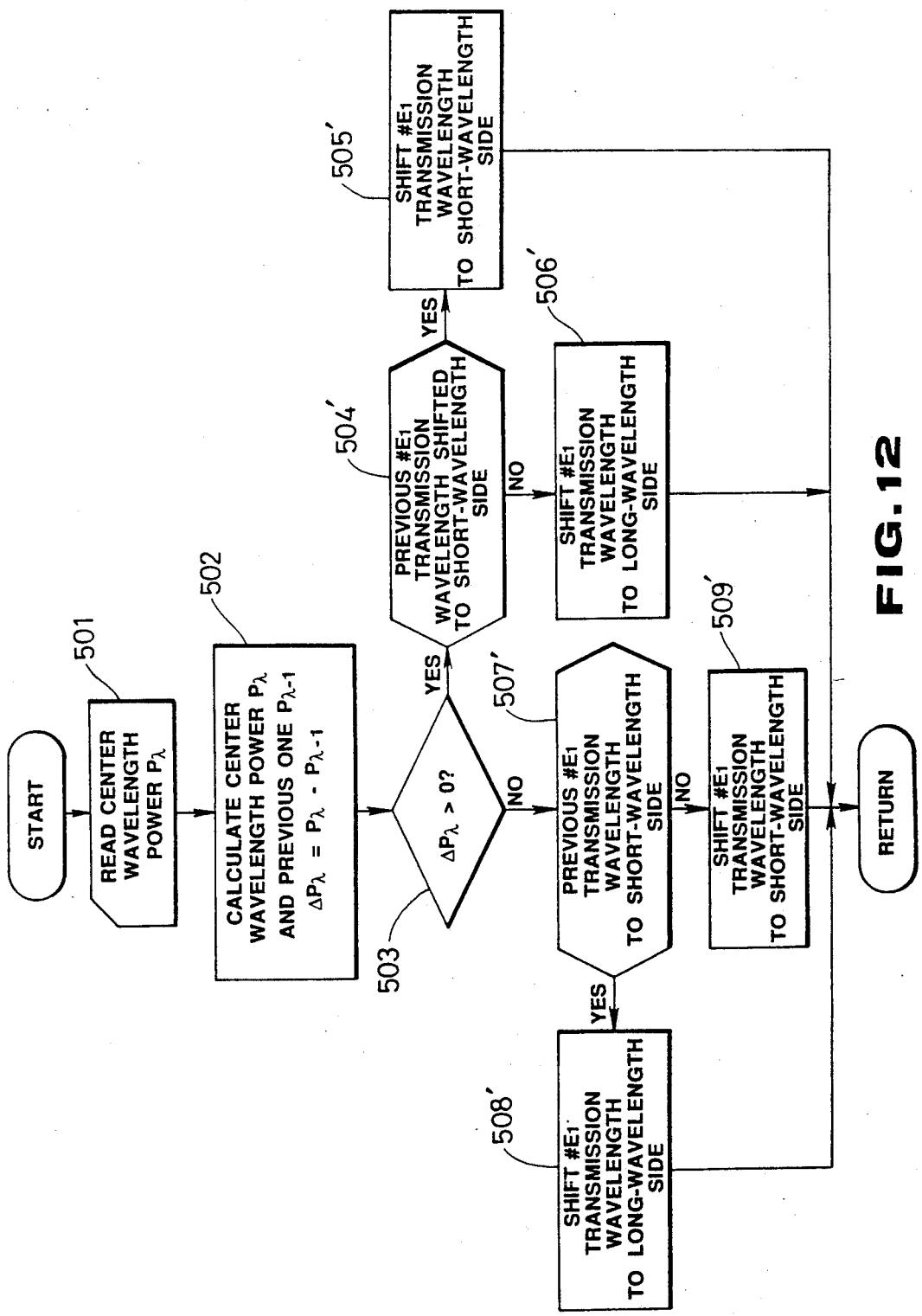
FIG. 12 is a flowchart showing another configuration example of the overlapping control subroutine.

Shown in FIG. 12 is another arrangement example the subroutine 404 in the latter case, in which not the etalon #E$_2$ but the etalon #E$_1$ is subjected to judgements in steps 504' and 507 while not the etalon #E$_2$ but the etalon #E$_1$ is subjected to judgements in steps 505', 506', 508' and 509'. Other judgement contents and processing contents are substantially the same as those shown in FIG. 9.

The overlapping control shown in FIG. 9 has been arranged so that the transmission wavelength of one #E$_2$ of the etalons 101 and 102 having the larger free spectral range is shifted in the increments of a unit shift amount, whereas the overlapping control shown in FIG. 12 has been arranged so that the transmission wavelength of one #E$_1$ of the etalons 101 and 102 having the smaller free spectral range is shifted in the increments of a unit shift amount. However, the overlapping control can be realized by changing the relative position of the etalons 101 and 102 and thus it may be arranged, for example, so that the both transmission wavelengths of the etalons 101 and 102 are shifted in increments or decrements of respectively different shift amounts.

It is judged in a step 405 of FIG. 3 whether or not the overlapping control has been completed. More in detail, in the step 405, it is determined whether the laser output power has reached a predetermined level through the above overlapping control. When it is determined that the laser output power has not reached the predetermined level, the program returns to the overlapping control subroutine 404 to repeat the overlapping control. If it is determined in the step 405 that the laser power has reached the predetermined level, then it is regarded as the overlapping control having been completed and the program proceeds to a center-wavelength control subroutine 406.

Figure 13:
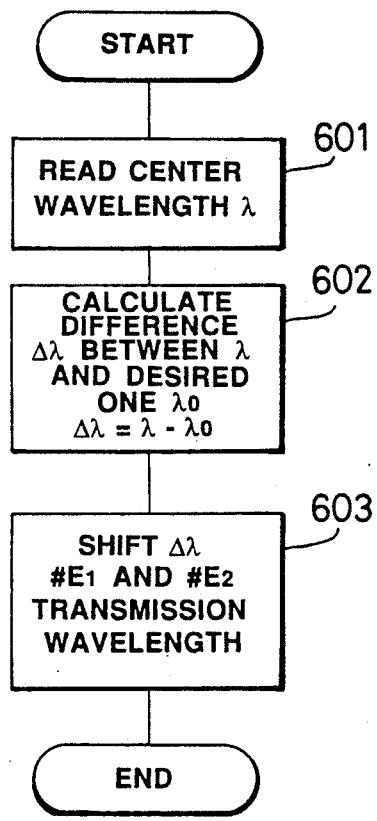
FIG. 13 is a configuration example of a center wavelength control subroutine.

Details of the subroutine 406 are shown in FIG. 13, in which an oscillated center wavelength $\lambda$ detected at the oscillated-center-wavelength/power detector 301 is first read (step 601).

Subsequently, a difference $\Delta \lambda$ ($= \lambda - \lambda_o$) between the center wavelength $\lambda$ read in the step 601 and a predetermined desired center wavelength is $\lambda_o$ is calculated (step 602). The difference $\Delta \lambda$ calculated in the step 602 is controlled to be zero by shifting the both transmission center wavelengths of the etalons #E$_2$ and #E$_2$ respectively by $\Delta \lambda$ at the same time (step 603). This enables the laser output center wavelength to coincide with the desired center wavelength $\lambda_0$. In this center wavelength control, since the laser output power is already at a sufficiently high level through the aforementioned overlapping control, it is possible to reliably detect the center wavelength $\lambda$ and to positively control it to coincide with the desired center wavelength $\lambda_0$.

After the center wavelength control has been competed and it has been detected that the center wavelength reaches the desired value (step 407), power control is effected to return the laser output power to its stationary level (step 408). When it is detected that the laser output power has reached the desired stationary level through the power control (step 409), this causes the above power control, overlapping control and center wavelength control in the stationary mode to start (step 401) and then causes the system to output an exposure ready completion signal to the not shown light exposer, whereby the shutter 108 already closed at the time of the laser activation is opened (step 411).

The above-mentioned control is realized under control of the CPUs 302 and 203 shown in FIG. 1.

Figure 14:
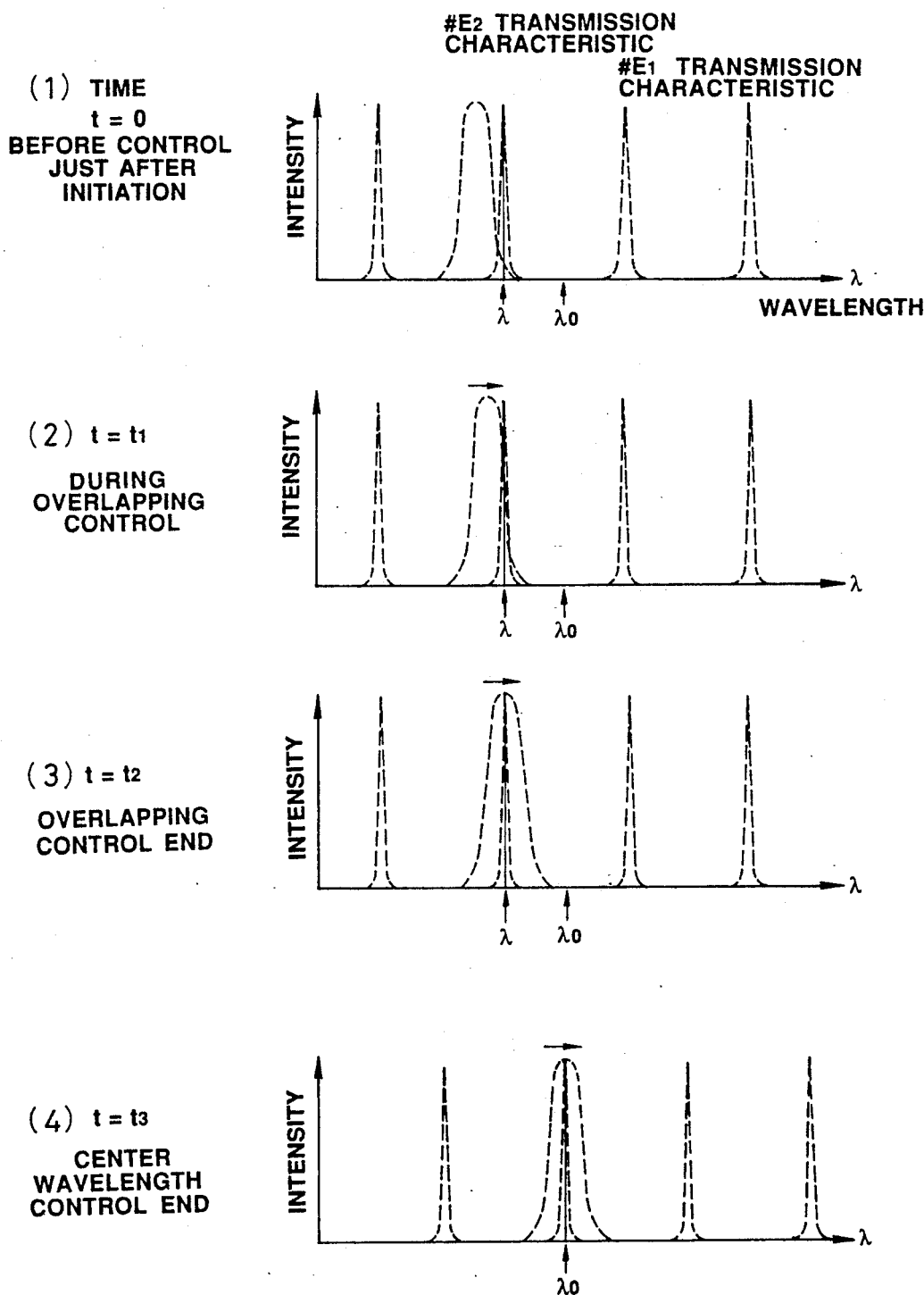
FIG. 14 shows graphs for explaining specific examples of the overlapping and center wavelength controls.

There is shown a specific example of the aforementioned overlapping control and center wavelength control in FIG. 14. In the drawing, a power at the center wavelength of the output laser beam is small in the laser activating mode prior to the start of the overlapping control, because the etalons #$E_1$ and #$E_2$ do not coincide with each other with respect to their transmission wavelength [t=0]. When the overlapping control is started the transmission wavelength of the etalon #$E_2$ having the larger free spectral range is shifted in increments of a predetermined unit shift amount to sequentially increase the center wavelength power (t=$t_1$). When the transmission wavelength of the etalon #$E_1$ coincides with that of the etalon #$E_2$, the center wavelength power becomes maximum and the overlapping control is terminated (t=$t_2$). Subsequently, the both transmission wavelengths of the etalons #$E_1$ and #$E_2$ are shifted at the same time up to their desired value (t=$t_3$). Thereby, the overlapping control and center wavelength control are completed.

Although the exciting intensity has been set to be larger than its stationary level in the laser activating mode in the foregoing embodiment, both of the exciting intensity and the repetition frequency may be set to be larger than their stationary values or only the repetition frequency may be set to be larger than its stationary value.

In the foregoing embodiment, the two etalons having relatively small and large free spectral ranges have been disposed between the laser chamber and the rear mirror to allow narrow-band oscillation. However, the two etalons may be replaced by a single etalon and a single diffraction grating, providing substantially the same arrangement as the above.

The power control (step 408) has been arranged in the foregoing embodiment so that the laser output power is returned to its stationary level after the completion of the overlapping control and center wavelength control, but the power control may be effected after the completion of the overlapping control and the center wavelength control may be effected after the power control.

Figure 15:
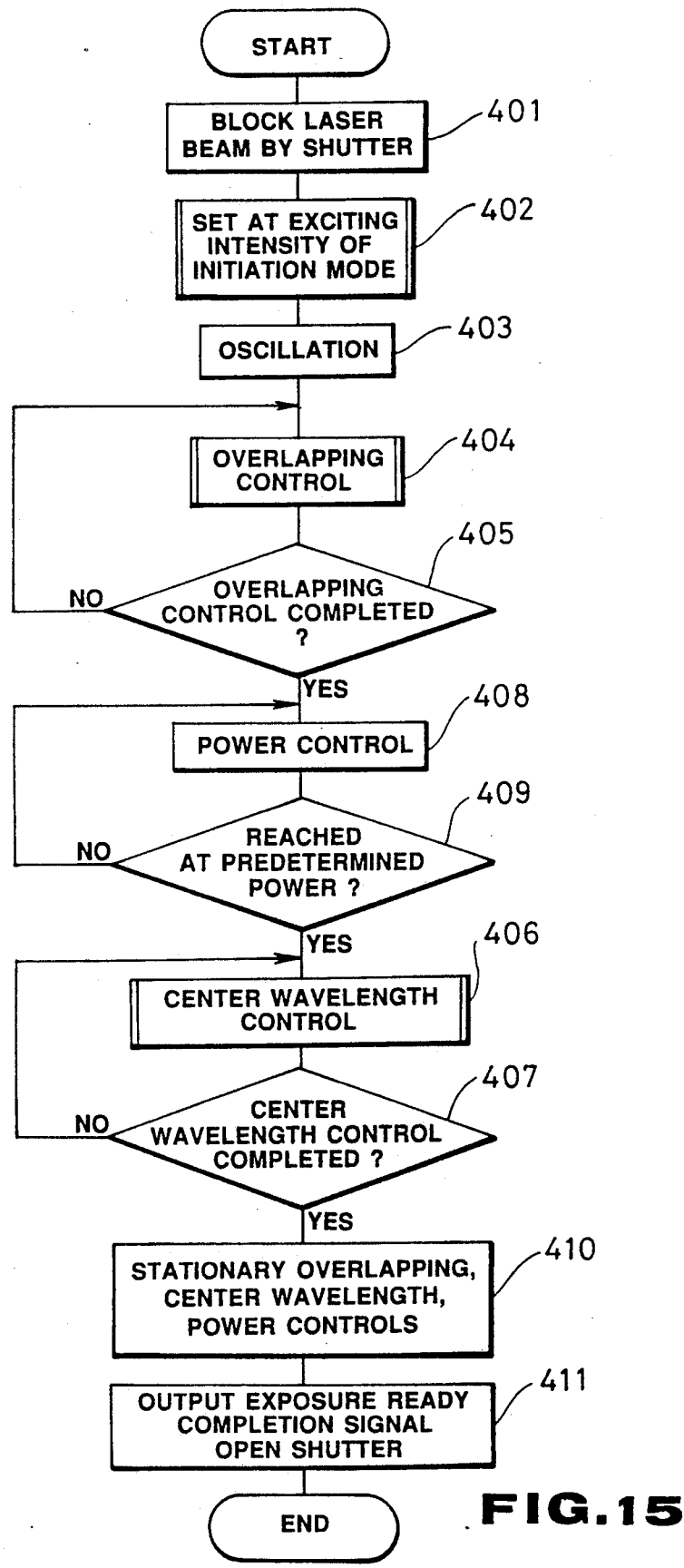
FIG. 15 is a flowchart for explaining the operation of another embodiment.

FIG. 15 shows another embodiment of the latter case. In the present embodiment, when the overlapping control is completed (step 405), the power control is executed (step 408). When it is determined that the laser output power reaches a predetermined level through the power control (step 409), the center wavelength control (subroutine 406) is carried out. Other arrangement is substantially the same as that shown in FIG. 3.

Description will next be made as to the output control of the excimer laser.

Figure 16:
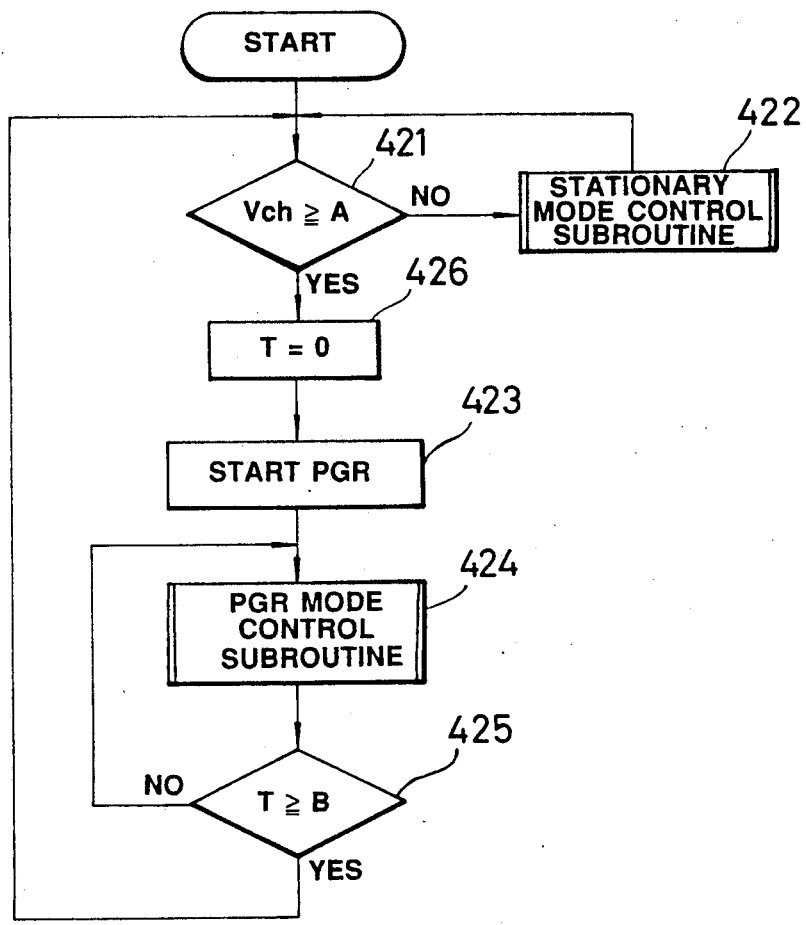
FIG. 16 is a flowchart for explaining and output control of the same embodiment.

Referring to FIG. 16, there is shown an embodiment of the output control of the narrow-band oscillation excimer laser having such an arrangement as shown in FIG. 1.

The present embodiment is designed to perform on a time control basis the output control of the excimer laser at the time of the partial gas replacement (PGR). First of all, it is judged whether or not a voltage Vch applied to the electrodes (not shown) provided within the laser chamber 107 is equal to or larger than a predetermined value A (step 421). If the application voltage Vch is smaller than the value A, then the partial gas replacement is not carried out and the program proceeds to a stationary mode control subroutine 422 which will be detailed later.

When it is determined in the step 421 that the application voltage Vch is equal to or larger than the value A, the elapsed value T is cleared and set at zero (step 426) and the laser gas within the laser chamber 107 is started to be partially replaced, that is, the partial gas replacement is started for adjustment of the components of the laser gas of the chamber 107 (step 423). The start of the partial gas replacement causes the program to go to a partial gas replacement (PGR) mode control subroutine 424. The partial gas replacement per set is completed in a relatively short time, but the influence of the gas replacement remains for a considerably long period of time. To avoid this, the present embodiment is arranged so that the partial gas replacement mode control subroutine 424 is suitably executed for a predetermined time (time B) after the partial gas replacement has been carried out. The details of the partial gas replacement mode control subroutine 424 will be detailed later.

The partial gas replacement mode control subroutine 424 is repeated until it is determined in a step 425 that the elapsed time T has reached a set time B. Determination of the elapsed time T having reached the set time B in the step 425 causes the program to return to the step 421 where it is again judged whether or not the electrode application voltage Vch is equal to or larger than the value A. If a relation Vch≧A is not satisfied, then the program proceeds to the stationary mode control subroutine 422. Satisfaction of the relation Vch≧A in the step 421 causes the program to again start the partial gas replacement (step 423).

Figure 17:
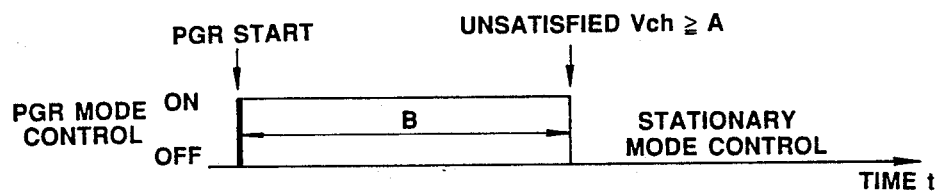
FIGS. 17 and 18 show different examples of the output control of the same embodiment, respectively.

FIG. 17 is a diagram for explaining an example when the system of FIG. 1 moved to the stationary mode control subroutine 422 through the partial gas replacement. As will be seen from FIG. 17, the start of the partial gas replacement causes the program to proceed to the partial gas replacement mode control subroutine 424 and after passage of the time B, the relation Vch≧A becomes unsatisfied, whereby the program goes to the stationary mode control subroutine 422. In FIG. 17, a thick line corresponds to the partial gas replacement time.

Figure 18:
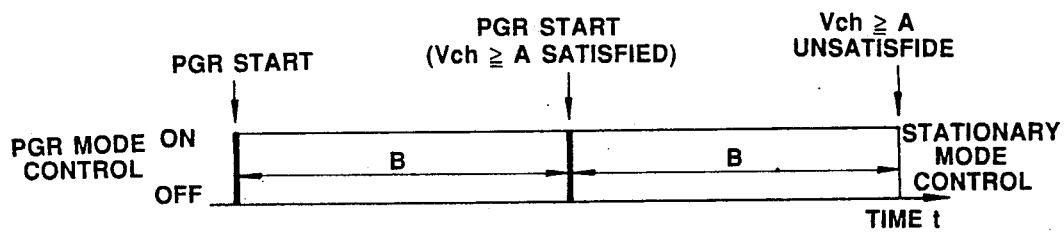

FIG. 18 is a diagram for explaining an example when the system moved to the stationary mode control subroutine 422 through the second partial gas replacement. As will be seen from FIG. 18. The start of the partial gas replacement causes the program to move to the partial gas replacement mode control subroutine 424. After passage of the time B, if the relation Vch≧A is again satisfied then the partial gas replacement is again initiated. Further, after passage of the additional time B, the relation Vch≧A becomes unsatisfied so that the program goes to the stationary mode control subroutine 422.

Figure 19:
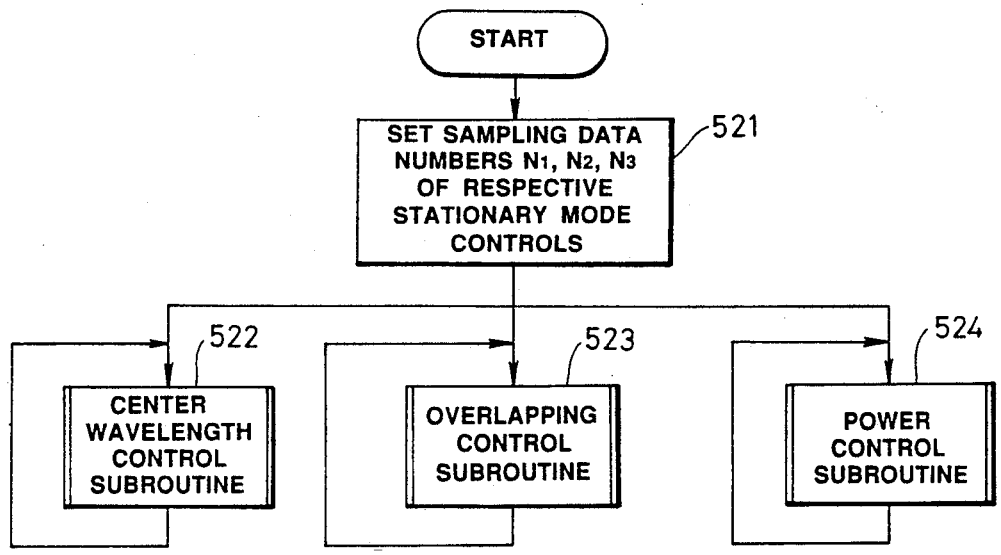
FIG. 19 is a flowchart showing an example of a stationary mode control subroutine.

Shown in FIG. 19 is an example of the stationary mode control subroutine 422, in which, first of all, the numbers of sampling data for the respective controls in the stationary mode are set, that is, the number $N_1$ of sampling data for the center wavelength control in the stationary mode, the number $N_2$ of sampling data for the overlapping control in the stationary mode and the number $N_3$ of sampling data for the power control in the stationary mode are set. In the illustrated embodiment, the respective sampling data numbers $N_1$, $N_2$, and $N_3$ are set so as to satisfy at least a relation $N_3 > N_2$ so that the overlapping control is asynchronous with the power control. This is because the overlapping control involves variations in the output power and thus the activation of the power control disables the overlapping control.

After setting of the sampling data numbers $N_1$, $N_2$ and $N_3$ for the respective controls in the stationary mode, a center wavelength control subroutine 522, an overlapping control subroutine 523 and a power control subroutine 524 are executed on the basis of these set sampling data numbers $N_1$, $N_2$ and $N_3$.

Figure 21:
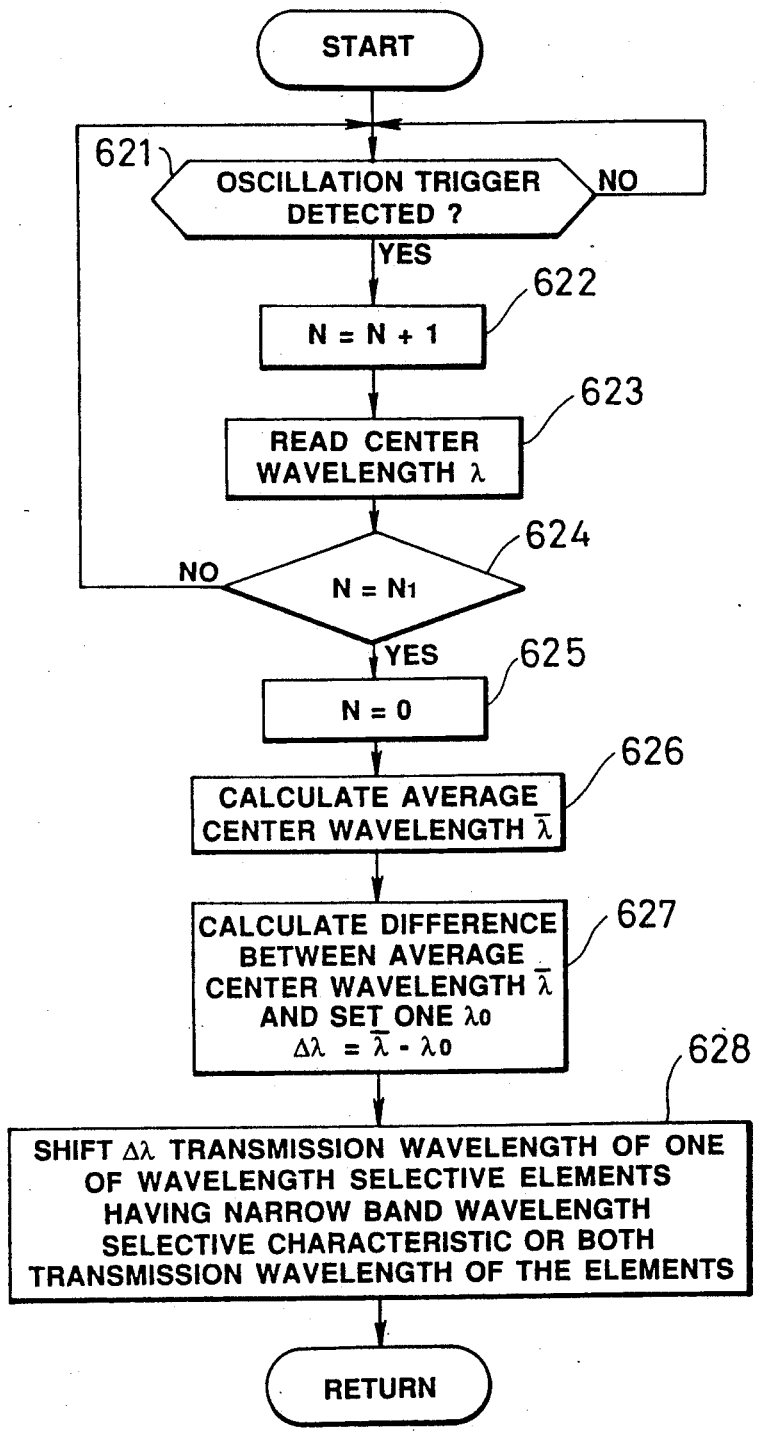
FIG. 21 is a flowchart showing an example of a center wavelength control subroutine.

FIG. 21 is a detailed flowchart of the center wavelength control subroutine 522. In the drawing, when detection of an oscillated laser trigger is determined (step 621), 1 is added to a value N (step 622) and the center wavelength $\lambda$ of the oscillated trigger is read (step 623). This operation is repeated until the value N reaches the sampling data number $N_1$ of the stationary-mode center wavelength control set in the step 501 (sep 624). If the value N reaches $N_1$, then the value N is cleared at zero (step 625) and an average value $\lambda$) of $N_1$ of the read center wavelengths $\lambda$ is calculated (step 626). Then, a difference $\Delta \lambda$ ($=\lambda-\lambda_o$) between the average center wavelength $\lambda$ and the preset desired wavelength $\lambda_o$ is calculated (step 627). And only a wavelength selective element having a narrow-wavelength selective characteristic or the respective wavelength selective elements (in the illustrated embodiment, only one of the etalons 101 and 102 having the smaller free spectral range or the both etalons) are shifted by $\Delta\lambda$ in transmission wavelength (step 628). At this stage, the center wavelength control subroutine 522 is completed.

Figure 22:
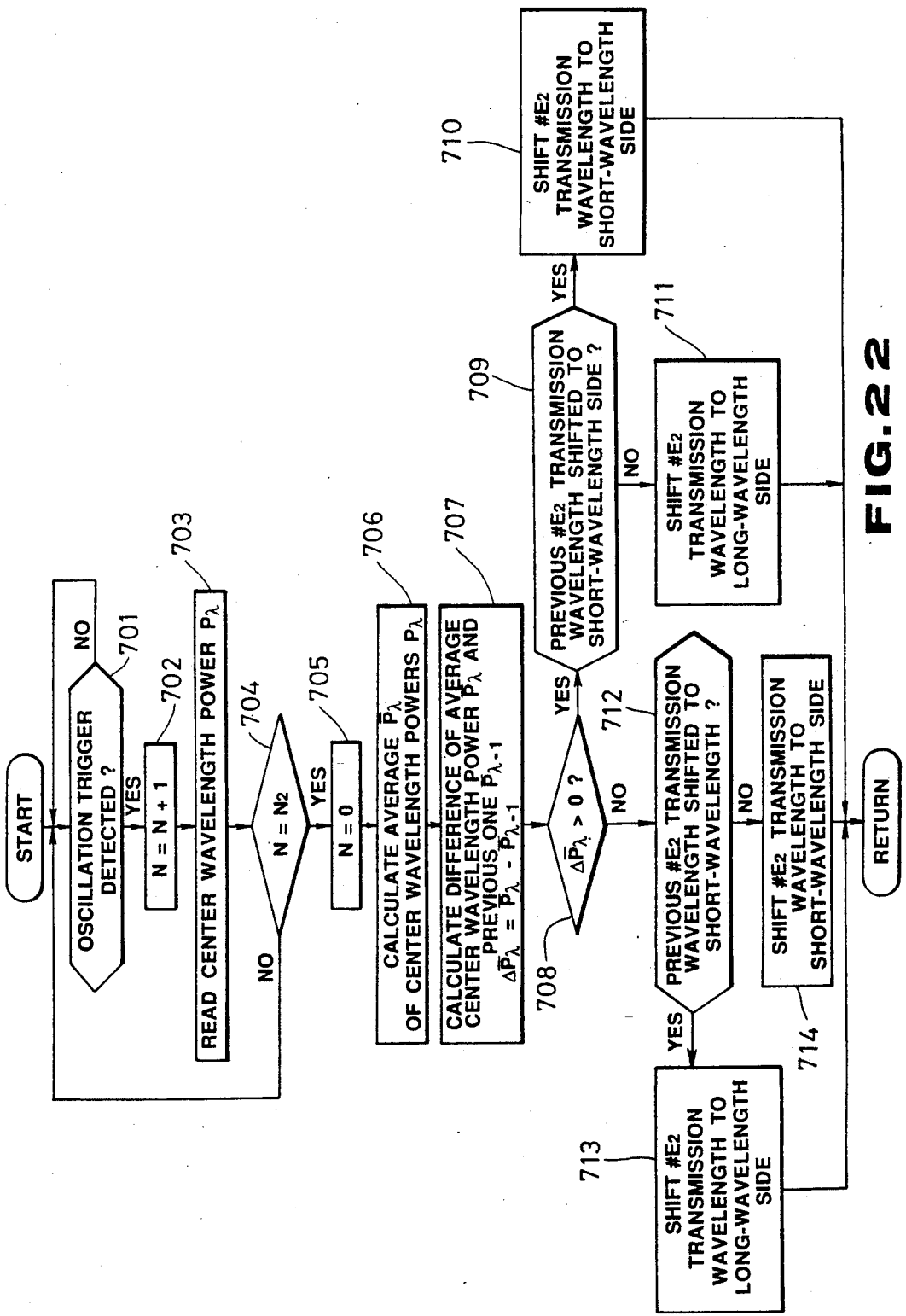
FIG. 22 is a flowchart showing an example of an overlapping control subroutine.

FIG. 22 is a detailed flowchart of the overlapping control subroutine 523. When detection of an oscillated laser trigger is determined (step 701), 1 is added to the value N (step 702) and the center wavelength power $P_\lambda$ is read on the basis of the oscillated trigqer (step 703). This operation is repeated until the value N reaches the sampling data number $N_2$ of the stationary-mode overlapping control set in the step 521 (step 704). If the value N reaches $N_2$, then the value N is cleared at zero (step 705) and an average value $\overline{P}_\lambda$ of $N_2$ of the read center wavelength powers $P_\lambda$ is calculated (step 706).

Next, a difference $\Delta \overline{P}_\lambda$ between the current average center wavelength power $\overline{P}_\lambda$ calculated in the step 706 and the previous average center wavelength power $\overline{P}_{\lambda-1}$ is calculated ($\Delta \overline{P}_\lambda = \overline{P}_\lambda - \overline{P}_{\lambda-1}$) (step 707).

Subsequently, it is decided in a step 708 whether or not the value $\Delta \overline{P}_\lambda$ calculated in the step 707 is positive ($\Delta \overline{P}_\lambda > 0$). Satisfaction of $\Delta \overline{P}_\lambda > 0$ causes the subroutine to go to a step 709 where it is judged whether or not one of the etalons 101 and 102 having the larger free spectral range (which etalon will be sometimes referred to as the etalon #$E_2$ hereinafter) has been shifted to its short-wavelength side with respect to the transmission wavelength at the time of the previous control (at the previous sampling time). If the judgement is that the transmission wavelength of the etalon #$E_2$ has been shifted to the short-wavelength side, then the subroutine moves to a step 710 to shift the transmission wavelength of the etalon #$E_2$ to the short-wavelength side further by the predetermined amount (unit shift amount). When it is determined in the step 709 that the transmission wavelength of the etalon #$E_2$ has been shifted to its long-wavelength side at the previous time, the subroutine proceeds to a step 711 to shift the transmission wavelength of the etalon #$E_2$ to the long-wavelength wavelength side by a predetermined amount (unit shift amount).

Satisfaction of the relation $\Delta P_\lambda 23\ 0$ is determined in the step 708, on the other hand, causes the subroutine to proceed to a step 712 where it is judged whether or not the transmission wavelength of the etalon #$E_2$ has been shifted to the short-wavelength side at the time of the previous control. If a shift to the short wavelength side is determined in the step 712, then the subroutine goes to a step 713 to shift the transmission wavelength of the etalon #$E_2$ to the long-wavelength side by a predetermined amount (unit shift amount). When the judgement in the step 712 is that the transmission wavelength of the etalon #$E_2$ has been shifted to the long-wavelength side at the previous time, the subroutine proceeds to a step 714 to shift the transmission wavelength of the etalon #$E_2$ to the short-wavelength side by a predetermined amount (unit shift amount).

In this way, in the overlapping control subroutine 523, the transmission wavelength shift direction of the etalon #$E_2$ is judged on the basis of the sign of the value $\Delta P_\lambda$ and the previous transmission wavelength shift direction to increase the laser output beam power, and the transmission wavelength of the etalon #$E_2$ is shifted in the judged direction by the unit shift amount.

Figure 23:
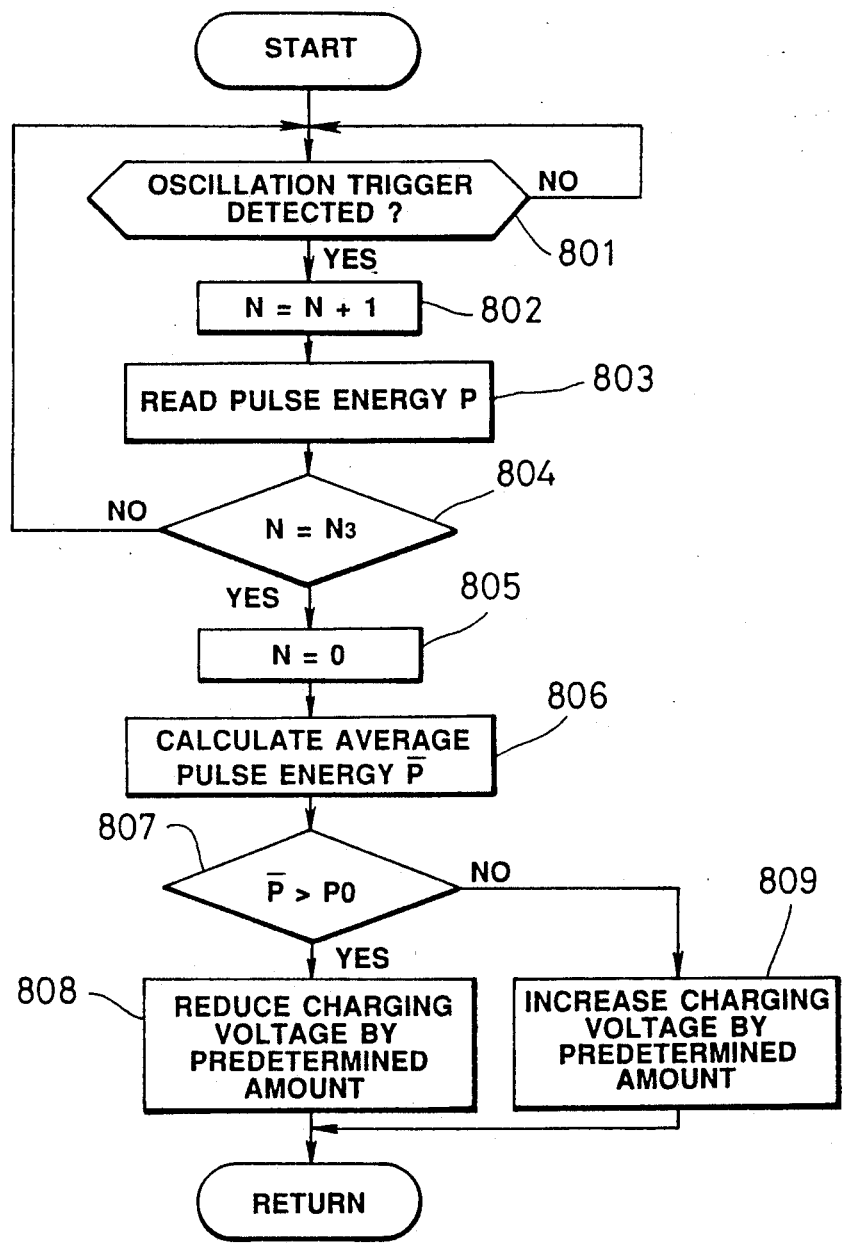
FIG. 23 is a flowchart showing an example of a power control subroutine.

Details of the power control subroutine are shown in FIG. 23, in which when an oscillated laser trigger is determined to have been detected (step 801), 1 is added to the value N (step 802) and a pulse energy P base on this oscillated trigger is read (step 803). This operation is repeated until the value N reaches the sampling data number $N_3$ of the stationary-mode power control set in the above step 521 (step 804). Satisfaction of a relation $N = N_3$ causes the value N to be cleared at zero (step 805) and an average value $\overline{P}$ of $N_3$ of the read pulse energies P is calculated (step 806). It is then judged whether or not the calculated value $\overline{P}$ is larger than a preset desired pulse energy $P_0$ (step 807). Satisfaction of a relation $\overline{P} > P_0$ causes a charging voltage, i.e., the electrode application voltage to be reduced by a predetermined amount (step 808). Unsatisfaction of the relation $P > P_0$ causes the charging voltage to be increased by a predetermined amount (step 809).

Figure 20:
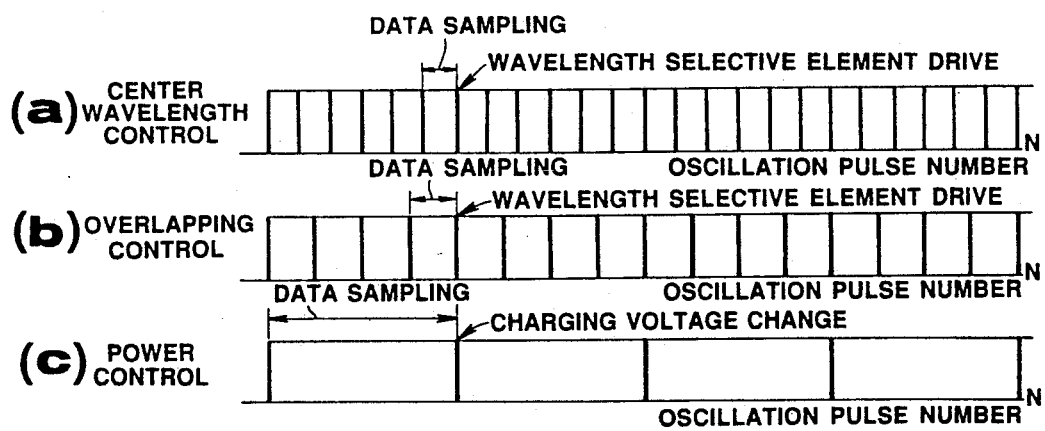
FIGS. 20(a)-20(d) show diagrams for explaining relationships between the center wavelength, overlapping and power controls based on execution of the subroutine of FIG. 19.

Shown in FIG. 20 are relationships between the center wavelength control, overlapping control and power control when the stationary-mode control subroutine shown in FIG. 19 is executed. In the drawing, the sampling data numbers $N_1$, $N_2$ and $N_3$ meet a relation $N_1 < N_2 < N_3$. More specifically, (a), (b) and (c) in FIG. 20 show the center wavelength control, overlapping control and power control, respectively. In the center wavelength control (a), vertical thick lines denote respectively a period of time during which the wavelength selective elements (etalons 101 and 102) are driven for the center wavelength control, and an interval between adjacent ones of the thick lines denotes a data sampling duration for the center wavelength control. In the overlapping control (b), vertical thick lines denote respectively a period of time during which the wavelength selective elements (etalons 101 and 102) are driven for the overlapping control and an interval between adjacent ones of the thick lines denotes a data sampling duration of the overlapping control. In the power control (c), vertical thick lines denote respectively a period of time during which a charging voltage or an electrode application voltage is changed for the power control, and an interval between adjacent ones of the thick lines denotes a data sampling duration for the power control. It will be appreciated from FIG. 20 that the control periods of the respective controls are sequentially incremented in the order of the center wavelength control, overlapping control and power control and the respective controls are executed mutually asynchronously.

Figure 24:
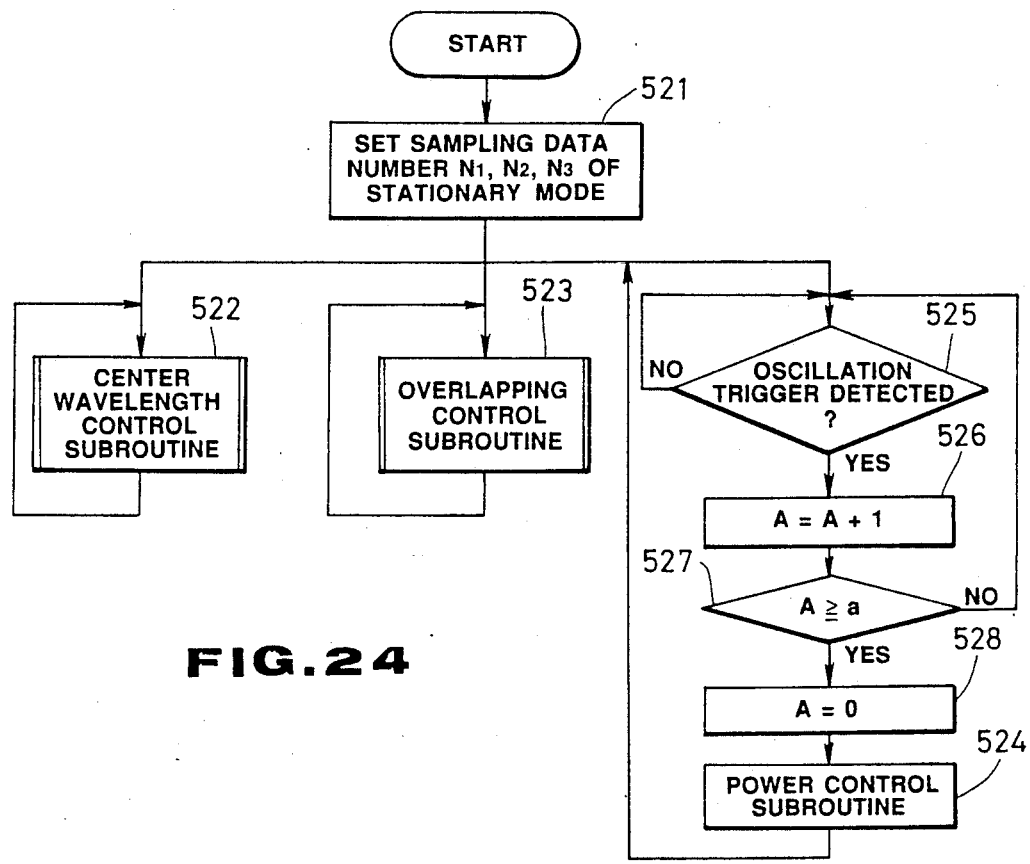
FIG. 24 is a flowchart showing another example of the stationary mode control subroutine.

FIG. 24 shows another configuration example of the stationary mode control subroutine, which is different from the subroutine of FIG. 19 only in the power control. That is, in FIG. 14, the data sampling period for the power control is set not to be a full interval between the previous and current charging voltage change periods but to be a predetermined interval just before the charging voltage change period. In FIG. 24, the center wavelength control and overlapping control are substantially the same as those in FIG. 19 and thus only the power control is explained in FIG. 24. In the power control. When an oscillated trigger is detected (step 525), 1 is added to the value A (step 526). This operation is repeated until the value A becomes equal to or larger than a value a (step 527), at which time the value A is cleared at zero (step 528) and the program proceeds to a power control subroutine 524. The subroutine 524 is substantially the same as that in FIG. 19. With such an arrangement, the reading operation of the pulse energy P for the power control is not carried out until the oscillated pulse number arrives at the value a, and only when the pulse number exceeds the value a, the reading operation of the pulse energy P for the power control is started.

Figure 25:
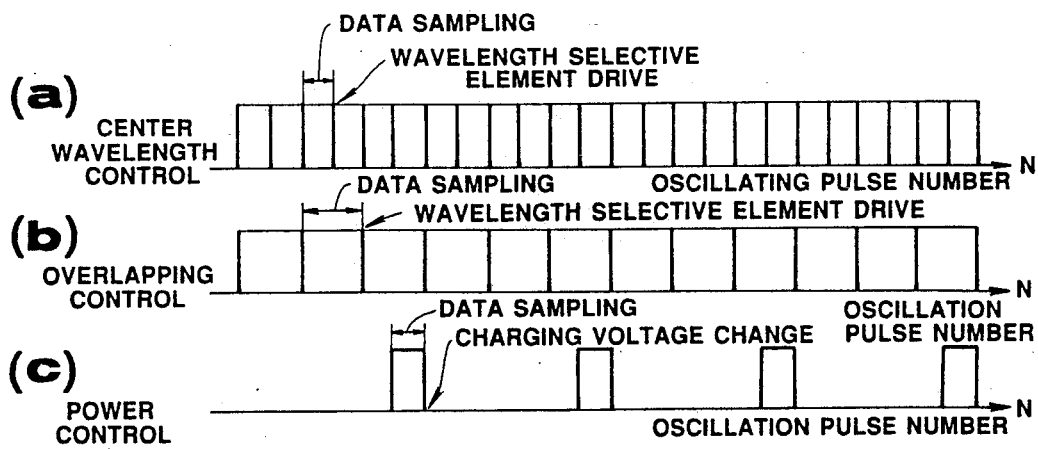
FIGS. 25(a)-25(c) show diagrams for explaining an example of the control manner of the same subroutine.

FIG. 25 shows relationships between the center wavelength control, overlapping control and power control when the stationary-mode subroutine shown in FIG. 24 is executed. In this case, the sampling data numbers $N_1 N_2$ and $N_3$ in the respective controls are set to meet a relation $N_2 > N_1 = N_3$. As will be clear from FIG. 25, the power control is carried out by sampling $N_3$ of energies of oscillated pulses just before the charging voltage change periods.

Figure 26:
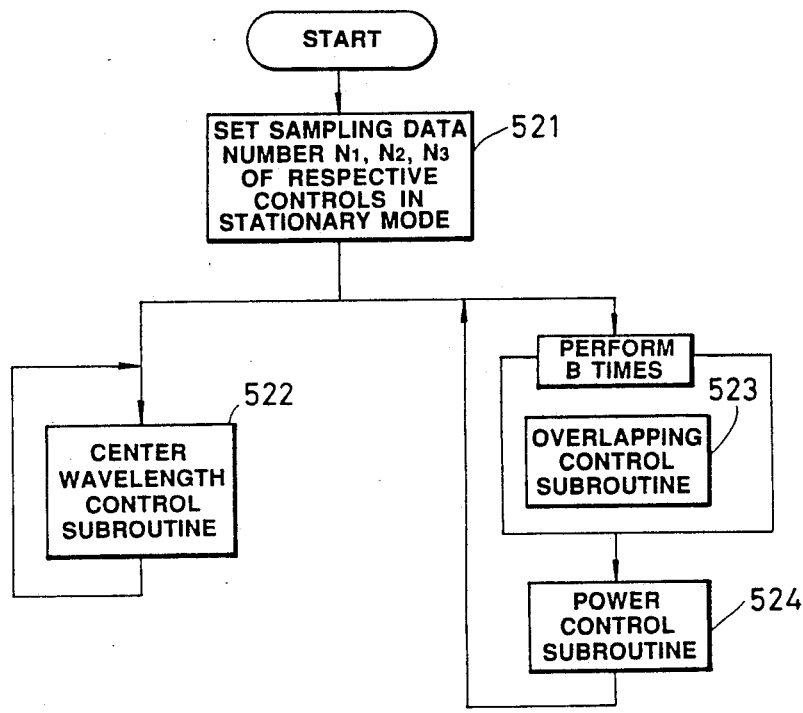
FIG. 26 is a flowchart showing a further example of the stationary mode control subroutine.

FIG. 26 shows a further configuration example of the stationary-mode control subroutine. In this example, the center wavelength control is executed independently but the overlapping control is first carried out and then the power control is effected by executing B times the power control subroutine 524 after execution of the overlapping control subroutine 523, which procedure is repeated. That is, with the arrangement of FIG. 26, the overlapping control and the power control are not carried out at the same time.

Figure 27:
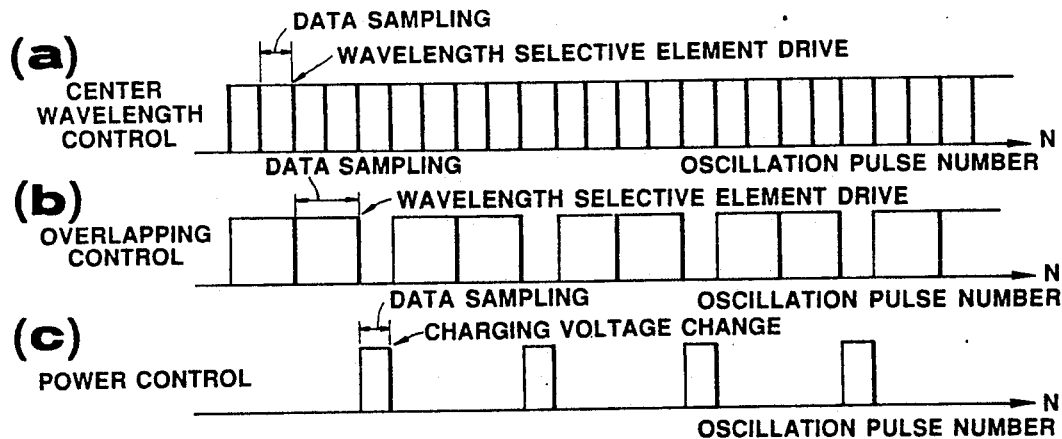
FIGS. 27(a)-27(c) show diagrams for explaining an example of the control manner of the same subroutine.

FIG. 27 shows diagrams for explaining relationships between the respective controls when the stationary mode subroutine of FIG. 26 is executed, in which case the sampling data numbers of the respective controls are set to meet the relation $N_2 > N_1 = N_3$ and B is set to be equal to 2. It will be seen from FIG. 27 that the overlapping control is executed two times and then the power control is executed for the first time, which procedure is repeated.

Figure 28:
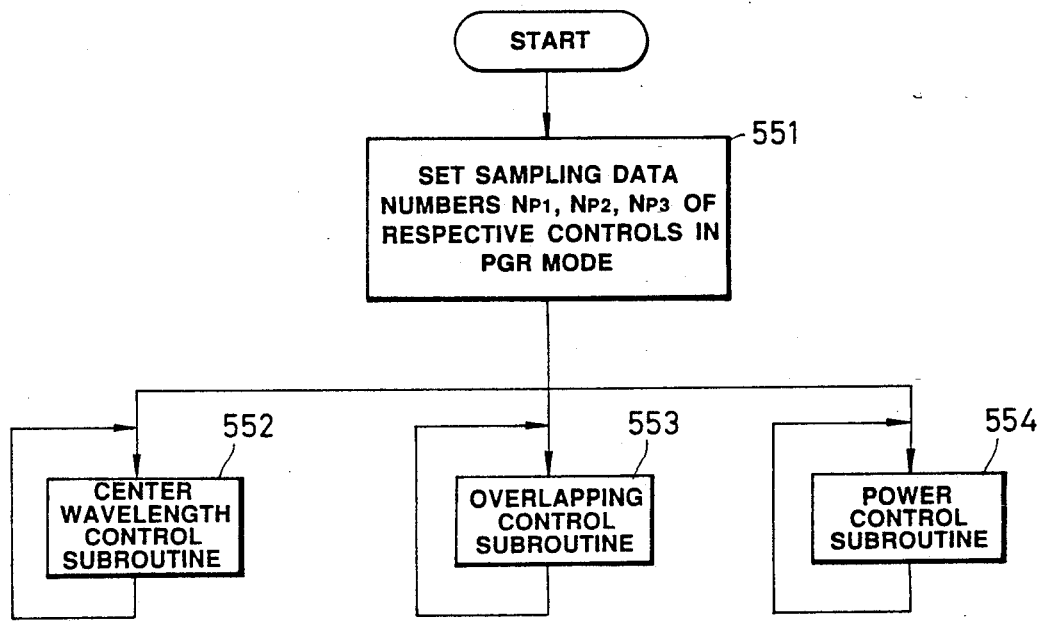
FIG. 28 is a flowchart showing an example of a partial gas replacement mode control subroutine.

FIG. 28 shows a configuration example of the partial-gas-replacement-mode control subroutine. During a predetermined period after the partial gas replacement has been executed, the laser output power varies to a large extent. In order to perform the power control in keeping with such variations in the laser output power it is necessary to set the control period of the power control to be shorter than that in the stationary mode control. More in detail, the laser control system must be able to quickly respond to an abrupt power variation during the partial gas replacement by setting the sampling data number in the power control at a small value to thereby allow frequent modification of the charging voltage. To this end, in the example of FIG. 28, the control period of the overlapping control is set to be equal to that of the power control. In this case, there may be a possibility that the overlapping control becomes disadvantageous to some extent, but in the illustrated embodiment, the power control is set to have priority over the overlapping control. In FIG. 28, sampling data numbers of the respective controls in the partial gas replacement mode are set, that is, the number $N_{P1}$ in the center wavelength control of the partial gas replacement mode, the number $N_{P2}$ in the overlapping control of the partial gas replacement mode and the number $N_{P3}$ in the power control of the partial gas replacement mode are set. In the illustrated embodiment, $N_{P2}$ is set to be equal to $N_{P3}$. When the sampling data numbers of the respective controls are set in a step 551, a center wavelength control subroutine 552, an overlapping control subroutine 553 and a power control subroutine 554 are carried out. The center wavelength control subroutine 552, overlapping control subroutine 553 and power control subroutine 554 are substantially the same as the routines 522, 523 and 524 in FIG. 19, and details of the subroutines 552, 553 and 554 are substantially the same as the those of FIGS. 21, 22 and 23, respectively.

Figure 29:
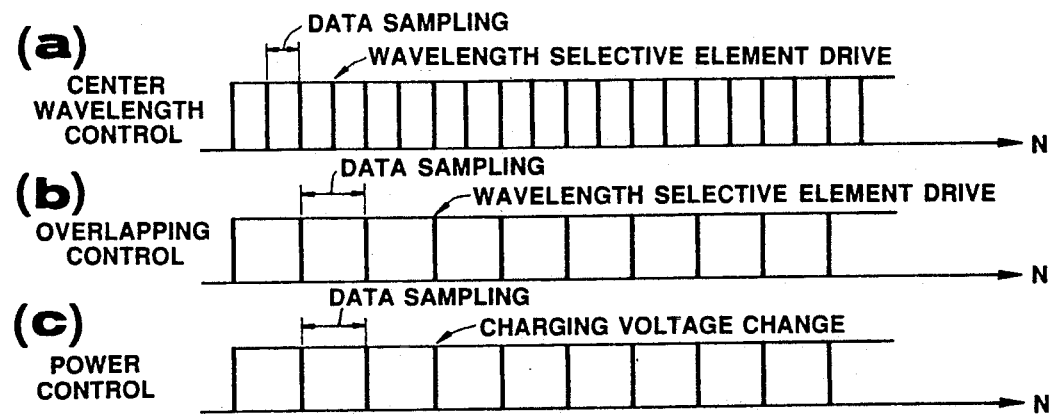
FIGS. 29(a)-29(c) show diagrams for explaining an example of the control manner of the same subroutine.

FIG. 29 shows relationships between the center wavelength control, overlapping control and power control when the partial gas replacement mode control subroutine of FIG. 28 is executed. As will be noted from FIG. 29 that, in the partial gas replacement mode control subroutine, the control period of the power control is shorter than that in the stationary mode control subroutine (refer to FIG. 20).

Figure 30:
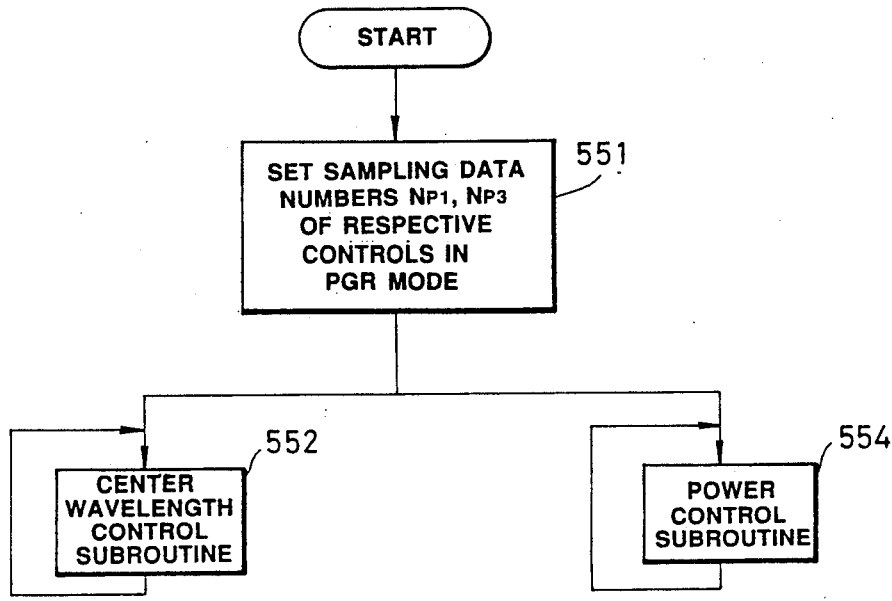
FIG. 30 is a flowchart showing another example of the partial gas replacement mode control subroutine.
Figure 31:
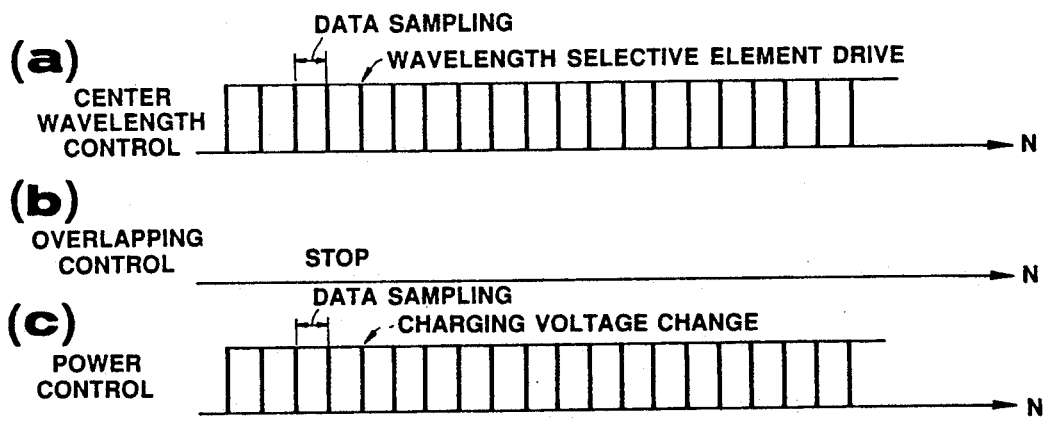
FIGS. 31(a)-31(c) show diagrams for explaining an example of the control manner of the same subroutine.

FIG. 30 shows another configuration example of the partial gas replacement mode control subroutine, in which case the overlapping control in the partial gas replacement mode control is not carried out. In other words, the present example is designed so that the power control is executed most preferentially. Shown in FIG. 31 are relationships between the respective controls in the present example.

Figure 32:
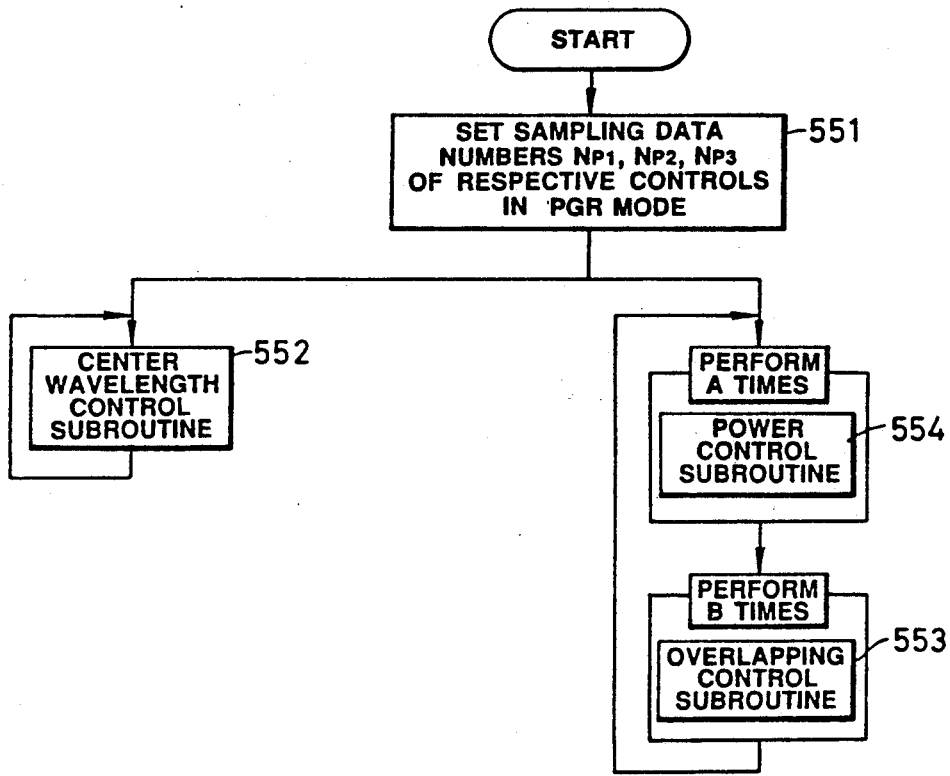
FIG. 32 is a flowchart showing a further example of the partial gas replacement mode control subroutine.

There is shown in FIG. 32 a further configuration example of the partial gas replacement mode control subroutine, in which the center wavelength control is executed independently but the overlapping control and the power control are alternately executed respectively a predetermined number of times. More specifically, the power control subroutine 554 is executed A times and subsequently the overlapping control subroutine 553 is executed B times, which procedure is repeated.

Figure 33:
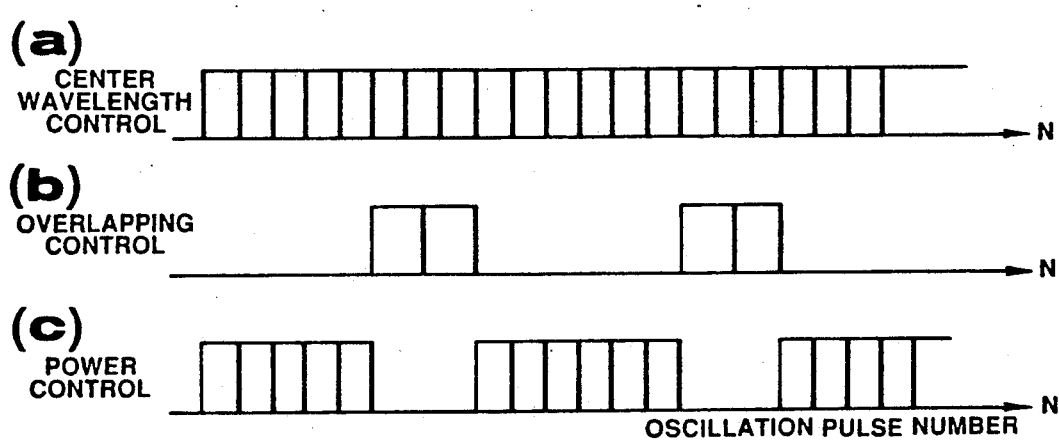
FIGS. 33(a)-33(c) show diagrams for explaining an example of the control manner of the same subroutine.

FIG. 33 shows relationships between the respective controls when the partial gas replacement mode control subroutine is executed. In the drawing, the values A and B are set to be 5 and 2 respectively.

Figure 34:
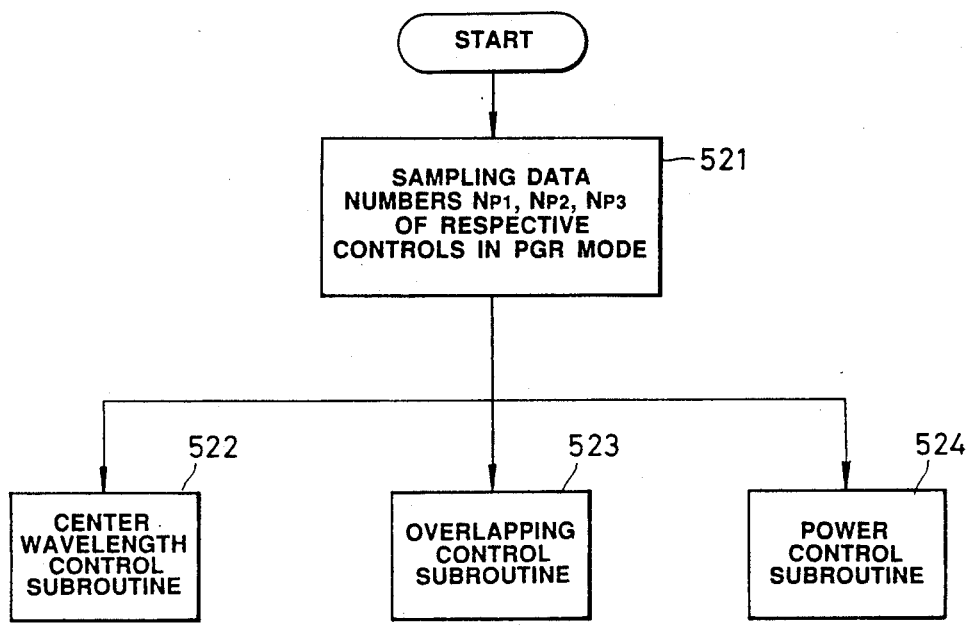
FIG. 34 is a flowchart showing yet a further example of the partial gas replacement mode control subroutine.
Figure 35:
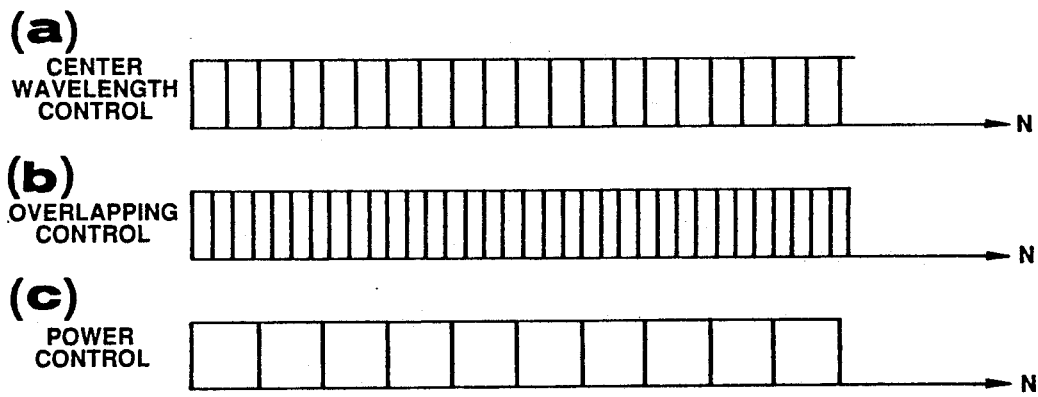
FIGS. 35(a)-35(c) show diagrams for explaining an example of the control manner of the same subroutine.

Yet a further configuration example of the partial gas replacement mode control subroutine is shown in FIG. 34, in which the respective sampling data numbers $N_{P1}$, $N_{P2}$ and $N_{P3}$ in the center wavelength, overlapping and power controls are set to satisfy a relation $N_{P3} > N_{P1} > N_{P2}$. And relationships between the respective controls are shown in FIG. 35.

Figure 36:
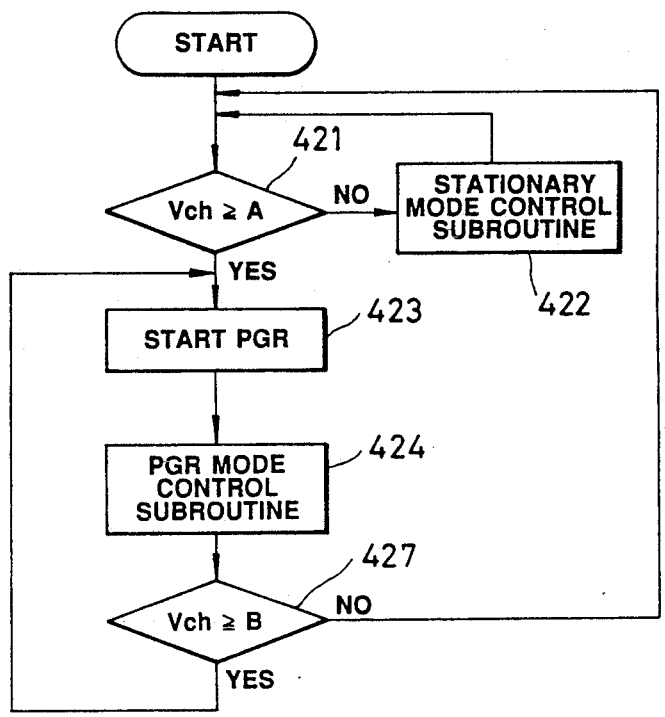
FIG. 36 is a flowchart for explaining another example of the output control.
Figure 37:
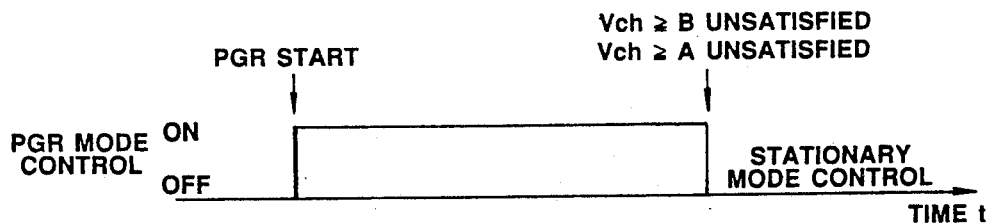
FIGS. 37 and 38 show different examples of the control of the same embodiment, respectively.
Figure 38:
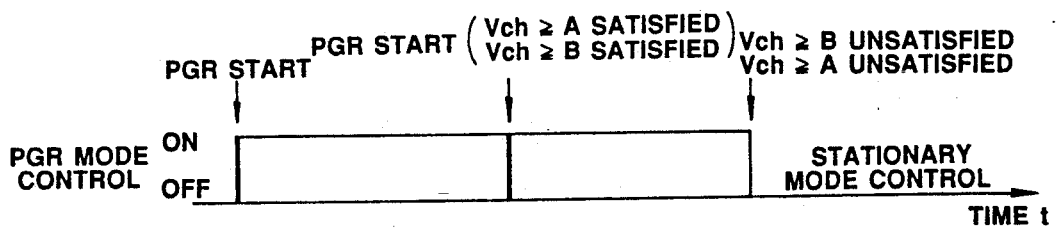

Referring to FIG. 36, there is shown another embodiment wherein the partial gas replacement mode control is effected by controlling the charging voltage, i.e., the electrode application voltage. In the present embodiment, the partial gas replacement mode control subroutine is designed so as to be repetitively executed until the charging voltage Vch becomes lower than the predetermined value B. More specifically, when a partial gas replacement mode control subroutine 424 is completed, it is judged whether or not the voltage Vch is equal to or larger than the value B (step 427). In this embodiment, the value B is selected to be smaller than or equal to the reference value A in the step 421 (A≧B). Satisfaction of the relation Vch≧B in the step 427 causes the program to return to the step 423, start the partial gas replacement and then proceed again to the partial gas replacement mode control subroutine 424. Unsatisfaction of the relation Vch≧B in the step 427 causes the program to return to the step 421 where it is decided whether or not the relation Vch≧A is met. If the relation Vch≧A is not met, then the program goes to the stationary mode control subroutine 422. Satisfaction of the relation Vch ≧A in the step 421 causes the program to go to the step 423 and again start the partial gas replacement. Such control is repeated until the relation Vch≧A becomes unsatisfied in the step 421. Shown in FIG. 37 is the manner of the above control when the first partial gas replacement causes control shift from the partial gas replacement mode control subroutine 424 to the stationary mode control subroutine 422. Also shown in FIG. 38 is the manner of the control when the second partial gas replacement causes control shift from the partial gas replacement mode control subroutine 424 to the stationary mode control subroutine 422.

Figure 39:
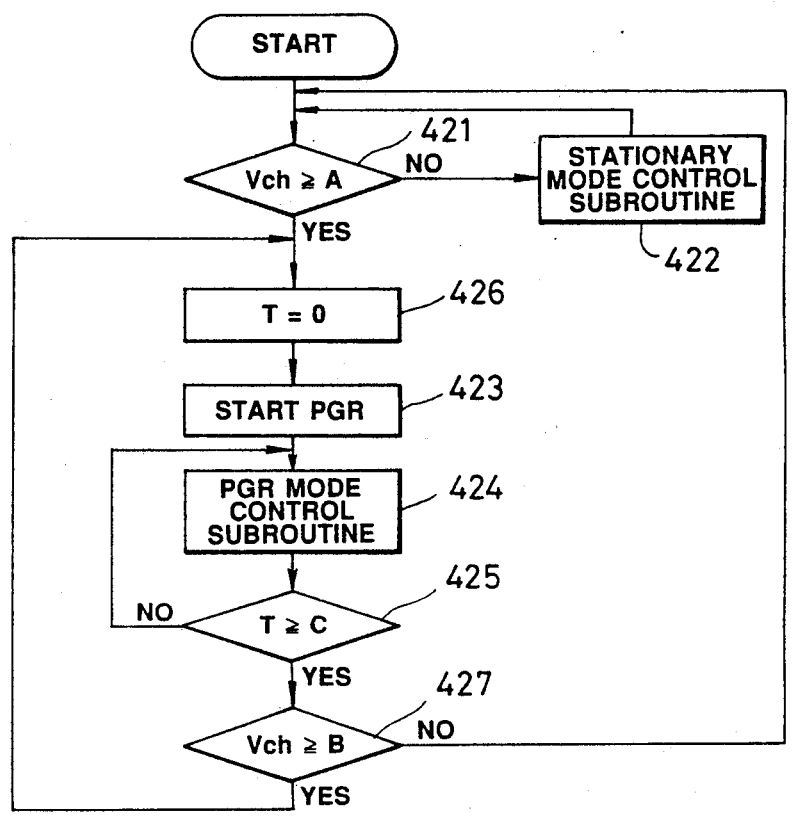
FIG. 39 is a flowchart showing the operation of a further example of the output control.

FIG. 39 shows a further embodiment in which the partial gas replacement mode control is carried out on both time and charging-voltage control basis. The present embodiment is arranged so that the partial gas replacement mode control subroutine 424 is repetitively executed until the time T elapsed from the partial gas replacement becomes larger than a predetermined value C and the charging voltage Vch becomes smaller than the value B. When the partial gas replacement mode control subroutine 424 is completed, it is judged whether or not a relation T ≧C is satisfied (step 425). Unsatisfaction of the relation T≧C causes the partial gas replacement mode control subroutine 424 to be again executed. If the relation T≧C is satisfied in step 425, then it is judged whether or not a relation Vch≧B is met (step 427). Satisfaction of the relation Vch≧B causes the program to return to the step 426 where the time T is cleared at zero and then the partial gas replacement is again carried out (step 423).

Figure 40:
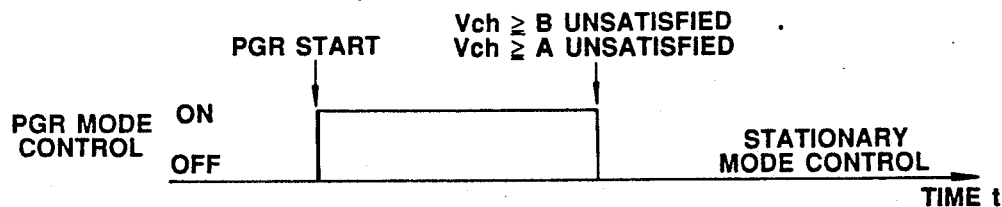
FIGS. 40 and 41 are different examples of the control of the same embodiment, respectively.
Figure 41:
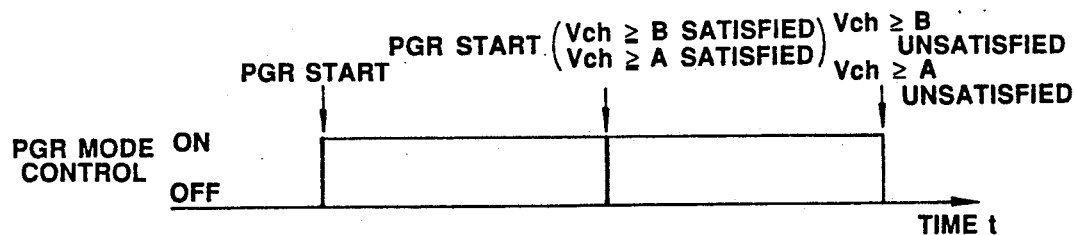

Unsatisfaction of the relation Vch≧B in the step 427 causes the program to return to the step 421 where it is judged whether or not a relation Vch≧A is satisfied. If the relation Vch≧A is not satisfied, then the program goes to the stationary mode control subroutine 422. Satisfaction of the relation Vch≧A in the step 421 causes the program to proceed to the step 426 where the time T is cleared at zero and the partial gas replacement is again carried out (step 423). This control procedure is repeated until the relation Vch≧A becomes unsatisfied in the step 421. Shown in FIG. 40 is the manner of the above control when the first partial gas replacement causes the program to be shifted from the partial gas replacement mode control subroutine 424 to the stationary mode control subroutine 422. Also shown in FIG. 41 is the manner of the above control when the second partial gas replacement causes the program to be shifted from the partial gas replacement mode control subroutine 424 to the stationary mode control subroutine 422.

INDUSTRIAL APPLICABILITY

In accordance with the present invention, there can be provided a narrow-band oscillation excimer laser which can minimize variations in the output power of the laser in the partial gas replacement mode and can produce a stable output power. In addition, according to the present invention, the quick completion of the control of the laser in its activating mode can be realized and a stable output power can be obtained in a short time.

The method and system for controlling the narrow-band oscillation excimer laser in accordance with the present invention can be applied for the purpose of controlling an excimer laser used as a light source of a reduced projection exposer.

We claim:

1. A method of controlling a narrow-band oscillation excimer laser including:
   a laser chamber filled with a laser gas;
   electrodes disposed within said laser chamber for exciting the laser gas within said laser chamber;
   at least two wavelength selective elements disposed in an optical path passing through said laser chamber in series with said optical path and having respectively controllable selection frequency bands;
   center-wavelength control means for controlling the selection frequency bands of said at least two wavelength selective elements to set a center wavelength of an output laser beam of said laser at a desired value;
   overlapping means for controllably overlapping the selection frequency bands of said at least two wavelength selective elements to set a power of said output laser beam at its maximum level; and
   power control means for controlling a voltage to be applied to said electrodes to thereby maintain substantially constant the power of said output laser beam;
   said method comprising:
   a stationary-mode control period setting step of setting respective control periods of said center-wavelength control means, said overlapping means and said power control means;
   a partial gas replacement step for carrying out partial gas replacement over the laser gas within said laser chamber when the voltage applied to said electrodes exceeds a preset predetermined value;
   a partial-gas-replacement-mode control period setting step of setting respective control periods of said center-wavelength control means, said overlapping means and said power control means in a partial gas replacement mode; and
   a mode change-over step, when said partial gas replacement is carried out, of controlling said center-wavelength control means, said overlapping means and said power control means with the control periods set respectively in said partial-gas-replacement-mode control period setting step and thereafter of controlling said center-wavelength control means, said overlapping means and said power control means with the respective control periods set in said stationary-mode control period setting step.

2. A method for controlling a narrow-band oscillation excimer laser as set forth in claim 1, wherein the control period of said overlapping means is set to be substantially the same as the control period of said power control means in said partial-gas-replacement-mode control period setting step.

3. A method for controlling a narrow-band oscillation excimer laser as set forth in claim 1, wherein overlapping control band on said overlapping means is inhibited during execution of power control based on said power control means in said partial gas replacement mode.

4. A method for controlling a narrow-band oscillation excimer laser as set forth in claim 1, wherein, in said mode change-over step, said center-wavelength control means, overlapping means and power control means are controlled with the control period set in said partial-gas-replacement-mode control period setting step for a predetermined time after said partial gas replacement is started, and thereafter said center-wavelength control means, overlapping means and power control means are controlled with the control period set in said stationary-mode control period setting step.

5. A method for controlling a narrow-band oscillation excimer laser set forth in claim 1, wherein, in said mode change-over step, said center-wavelength control means, overlapping means and power control means are controlled with the control period set in said stationary-mode control period setting step.

6. A method for controlling a narrow-band oscillation excimer laser as set forth in claim 1, wherein, in said mode change-over step, said center-wavelength control means, overlapping means and power control means are controlled with the control period set in said partial-gas-replacement-mode control period setting step for a time after said partial gas replacement is started until the voltage to be applied to said electrodes drops down to a predetermined value, and thereafter said center-wavelength control means, overlapping means and power control means are controlled with the control period set in said stationary-mode control period setting step.

7. A method for controlling a narrow-band oscillation excimer laser as set forth in claim 1, wherein, in said mode change-over step, said center-wavelength control means, overlapping means and power control means are controlled with the control period set in said partial-gas-replacement-mode control period setting step for a time after said partial gas replacement is started until a predetermined time elapses and until the voltage to be applied to said electrodes drops down to a predetermined value, and thereafter said center-wavelength control means, overlapping means and power control means are controlled with the control period set in said stationary-mode control period setting step.

8. A system for controlling a narrow-band oscillation excimer laser, comprising:
a laser chamber filled with a laser gas;
electrodes disposed within said laser chamber for exciting the laser gas within said laser chamber;
at least two wavelength selective elements disposed in an optical path passing through said laser chamber in series therewith and having respectively controllable selection frequency bands;
center-wavelength control means for controlling the selection frequency bands of said at least two wavelength selective elements to set a center wavelength of an output laser beam of said laser at a desired value;
overlapping means for controllably overlapping the selection frequency bands of said at least two wavelength selective elements to set a power of said output laser beam at its maximum;
power control means for controlling a voltage to be applied to said electrodes to set the power of said output laser beam to be substantially constant;
detection means for detecting when the voltage to be applied to said electrodes exceeds a predetermined value and providing a detection output;
partial gas replacement means for performing partial gas replacement over the laser gas within said laser chamber according to the detection output of said detection means;
first mode setting means for setting a first control mode to set a control period of said power control means to be longer than a control period of said overlapping control means;
second mode setting means for setting a second control mode to set the control period of said power control means to be substantially equal to the control period of said overlapping control means; and
control means for controlling said center-wavelength control means, overlapping means and power control means in the second mode set by said second mode setting means at least for a predetermined time after said partial gas replacement means causes start of the partial gas replacement, and thereafter for controlling said center-wavelength control means, overlapping means and power control means in the first mode set by said first mode setting means.

9. A system for controlling a narrow-band oscillation excimer laser comprising:
a laser chamber filled with a laser gas;
electrodes disposed within said laser chamber for exciting the laser gas within said laser chamber;
at least two wavelength selective elements disposed in an optical path passing through said laser chamber in series there with and having respectively controllable selection frequency bands;
center-wavelength control means for controlling the selection frequency bands of said at least two wavelength selective elements to set a center wavelength of an output laser beam of said laser at a desired value;
overlapping means for controllably overlapping the selection frequency bands of said at least two wavelength selective elements to set a power of said output laser beam at its maximum;
power control means for controlling a voltage to be applied to said electrodes to set the power of said output laser beam to be substantially constant;
detection means for detecting when the voltage to be applied to said electrodes exceeds a predetermined value;
partial gas replacement means for performing partial gas replacement over the laser gas within said laser chamber according to the detection output of said detection means;
first mode setting means for setting a first control mode to set a control period of said power control means to be longer than a control period of said overlapping control means;
second mode setting means for setting a second control mode to inhibit overlapping control of said overlapping control means during execution of power control by aid power control means; and
control means for controlling said center-wavelength control means, overlapping means and power control means in the second mode set by said second mode setting means at least for a predetermined time after said partial gas replacement means causes start of the partial gas replacement, and thereafter for controlling said center-wavelength control means, overlapping means and power control means in the first mode set by said first mode setting means.

10. A method for controlling a narrow-band oscillation excimer laser including:

a laser chamber filled with a laser gas;

at least two wavelength selective elements disposed in an optical path passing through said laser chamber in series with said optical path and having respectively controllable selection frequency bands;

center-wavelength control means for controlling the selection frequency bands of said at least two wavelength selective elements to set a center wavelength of an output laser beam of said laser at a desired value; and overlapping means for controllably overlapping the selection frequency bands of said at least two wavelength selective elements to set a power of said output laser beam at its maximum level;

said method comprising the steps of:

carrying out overlapping control with said overlapping means only at the time of starting said narrow-band oscillation excimer laser; and carrying out center wavelength control with said center-wavelength control means after completion of said overlapping control.

11. A method for controlling a narrow-band oscillation excimer laser as set forth in claim 10, wherein said step of center wavelength control based on said center-wavelength control means is carried out by shifting the selection frequency bands of said at least two wavelength selective elements simultaneously by a predetermined wavelength.

12. A method for controlling a narrow-band oscillation excimer laser as set forth in claim 10, wherein said step of overlapping control based on said overlapping means is carried out until an output power of said narrow-band oscillation excimer laser reaches an intensity sufficient to carry out the center wavelength control with said center-wavelength control means.

13. A method for controlling a narrow-band oscillation excimer laser as set forth in claim 10, further comprising a step of controlling an exciting intensity of a laser medium within said laser chamber to set an output power of said narrow-band oscillation excimer laser to be larger than a predetermined level at the time of starting said excimer laser.

14. A method for controlling a narrow-band oscillation excimer laser as set forth in claim 10, further comprising a step of setting a repetitive period of laser oscillation of said narrow-band oscillation excimer laser at the time of starting said excimer laser to be higher than a repetitive period in the stationary state of said laser.

15. A method for controlling a narrow-band oscillation excimer laser as set forth in claim 10, wherein said step of overlapping control based on said overlapping means is carried out by sampling the output power of said excimer laser at a predetermined sampling number and by shifting at least one of the selection frequency bands of said wavelength selective elements on the basis of an average of the sampled values, and said method further comprises a step of setting said sampling number at the time of starting said excimer laser to be smaller than a sampling number in its stationary state.

16. A method for controlling a narrow-band oscillation excimer laser as set forth in claim 10, wherein said step of overlapping control based on said overlapping means is carried out by shifting at least one of selection frequency bands of said wavelength selective elements in predetermined increments on the basis of the output power of said excimer laser and wherein said method further comprises a step of setting said predetermined increments at the time of starting said excimer laser to be larger than in its stationary state.

17. A system for controlling a narrow-band oscillation excimer laser comprising:

a laser chamber filled with a laser gas;

at least two wavelength selective elements disposed in an optical path passing through said laser chamber in series with said optical path and having respectively controllable selection frequency bands;

center-wavelength control means for controlling the selection frequency bands of said at least two wavelength selective elements to set a center wavelength of an output laser beam of said laser at a desired value;

overlapping means for controllably overlapping the selection frequency bands of said at least two wavelengths selective elements to set a power of said output laser beam at its maximum level; and control means for controlling the overlapping control based on said overlapping means to be carried out only at the time of starting said excimer laser and for controlling the carrying out of center wavelength control based on said center-wavelength control means after completion of said overlapping control.

* * * * *